TRIPPING MEANS FOR CIRCUIT BREAKERS

Filed July 6, 1964

14 Sheets-Sheet 1

Feb. 28, 1967 W. H. SOUTH ETAL 3,307,123

TRIPPING MEANS FOR CIRCUIT BREAKERS

Filed July 6, 1964 14 Sheets-Sheet 2

WITNESSES:
John G. Chopp
Edwin E. Barker

INVENTORS
William H. South and
Joseph D. Findley
BY
Clement L. McHale
ATTORNEY

Feb. 28, 1967 W. H. SOUTH ET AL 3,307,123

TRIPPING MEANS FOR CIRCUIT BREAKERS

Filed July 6, 1964 14 Sheets-Sheet 7

Feb. 28, 1967 W. H. SOUTH ETAL 3,307,123

TRIPPING MEANS FOR CIRCUIT BREAKERS

Filed July 6, 1964

14 Sheets-Sheet 10

Feb. 28, 1967 W. H. SOUTH ET AL 3,307,123

TRIPPING MEANS FOR CIRCUIT BREAKERS

Filed July 6, 1964 14 Sheets-Sheet 13

United States Patent Office
3,307,123
Patented Feb. 28, 1967

3,307,123

TRIPPING MEANS FOR CIRCUIT BREAKERS

William H. South, McKeesport, and Joseph D. Findley, Jr., Pittsburgh, Pa., assignors to Westinghouse Electric Corporation, East Pittsburgh, Pa., a corporation of Pennsylvania Filed July 6, 1964, Ser. No. 380,276
22 Claims. (Cl. 335—18)

This invention relates to circuit breakers and more particularly, to tripping means for circuit breakers.

In certain types of circuit breakers, the breaker is equipped with an overcurrent tripping means which includes means for tripping the breaker with a relatively long time delay for certain values of overload current. In certain known circuit breaker constructions, a tripping means is provided which includes an electromagnet which operates against the force of a calibrating spring and a time delay device, such as a fluid dashpot. A conventional tripping means of this type is responsive to a predetermined range of overload currents to effect tripping of the circuit breaker if the overload current persists for a time interval which varies with the magnitude of the overload current. If the overload current does not persist for a predetermined time interval or delay required to effect tripping of the breaker, then the tripping means is resettable to its normal operating condition so as to provide a time delay tripping operation when the next overload current condition occurs.

A disadvantage of a conventional tripping means of the type described is that for any overload current in the operating range to which the tripping means is responsive, the tripping means does not always affect the operation of the circuit breaker in the same way for certain time durations of the overload current. In particular, if an overload current of a particular value persists for less than a predetermined minimum time interval which is referred to in the art as the "resettable delay time," and then decreases below a predetermined value, the tripping means will always be resettable or returnable to its normal operating condition. If the overload current persists for more than a predetermined maximum time interval, then the tripping means will always effect the tripping of the circuit breaker. If, however, a particular overload current persists for a time interval greater than the minimum interval just mentioned, but less than the maximum time interval just mentioned, the tripping means of the type described may either be resettable to its normal operating condition or effect a tripping operation of the circuit breaker. In other words, due to the characteristics of conventional electromagnets, calibrating springs and time delay devices included in known tripping means of the type described, the operating time-current characteristics of such a tripping means can only be defined in terms of an operating band having a relatively large time width which does not lend itself to close coordination with operating characteristics of electrical equipment and circuits which a circuit breaker is intended to protect.

Another disadvantage of a conventional tripping means of the type described is that in order to effect tripping of the circuit breaker, the force provided by the electromagnet must exceed the sum of the resistances exerted by the calibrating spring, the time delay device and certain frictional forces in the associated operating mechanism of the circuit breaker. In addition, such a tripping means may be subject to vibration and the associated wear of parts during certain operating conditions along with the associated noise of such vibration.

The tripping means of the breaker may also include means for independently tripping the breaker instantaneously or with a relatively short time delay when certain higher values of overload currents occur. When a conventional instantaneous tripping means comprises an electromagnetic means which operates against a calibrating spring to effect tripping of the associated circuit breaker by the release of a latching means in the tripping means of the breaker when certain overload currents occur, the force required for resetting the latching means in the instantaneous tripping means of the breaker may be increased in order to overcome certain forces which result due to the calibrating spring of the instantaneous tripping means. It is therefore desirable to provide improved tripping means for circuit breakers which overcome the above described disadvantages and which provide certain other advantages.

It is an object of this invention to provide a new and improved tripping means for circuit breakers.

Another object of this invention is to provide an improved circuit breaker embodying time delay tripping means.

A further object of this invention is to provide a circuit breaker having improved means for tripping the circuit breaker instantaneously.

A still further object of this invention is to provide a circuit breaker having improved means for tripping the circuit breaker with a relatively short time delay characteristic.

A still further object of this invention is to provide a circuit breaker having improved means for tripping the circuit breaker with a longer time delay for certain operating conditions and instantaneously or with a relatively shorter time delay for other operating conditions.

A still further object of this invention is to provide an improved time delay tripping means or control device for circuit breakers which provides a predetermined time delay which is substantially inversely proportional to the square of the overload current to more closely coordinate the operating characteristics of the tripping means with the thermal characteristics of electrical equipment and circuits to be protected.

A still further object of the invention is to provide an improved time delay tripping means for circuit breakers in which the variation in the time delay provided for any overload current prior to tripping of the breaker is reduced or substantially eliminated.

A still further object of this invention is to provide an improved time delay tripping means in which vibration along with the associated noise and wear of parts is substantially reduced or eliminated.

Other objects of the invention will, in part be obvious and will, in part, appear hereinafter.

For a fuller understanding of the nature and objects of the invention, reference should be had to the following detailed description, taken in conjunction with the accompanying drawings in which.

Figure 1:
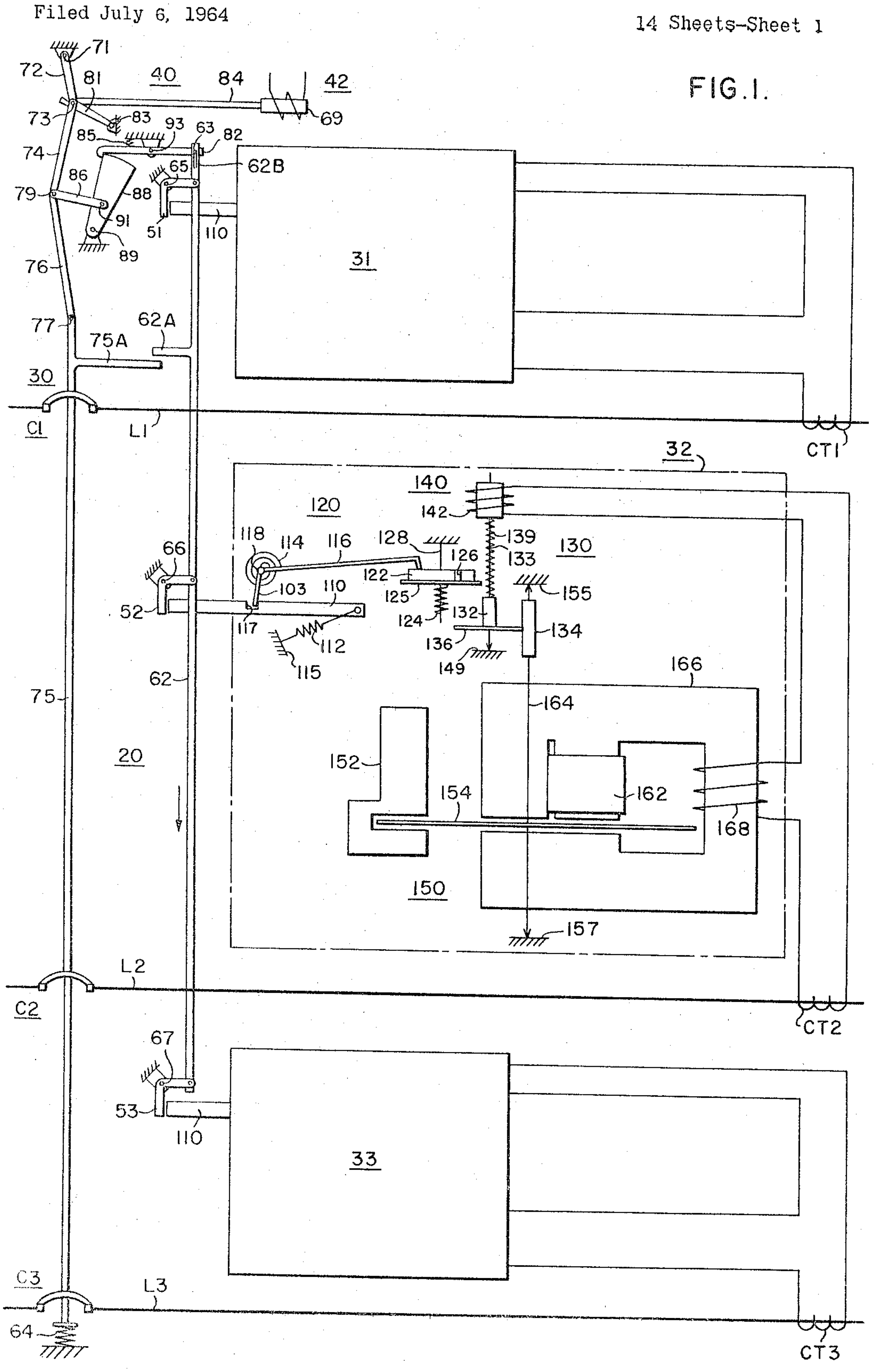
FIGURE 1 is a schematic view of a circuit breaker embodying the principles of the invention including a diagram of the control circuit for energizing the time delay tripping means.
Figure 1A:
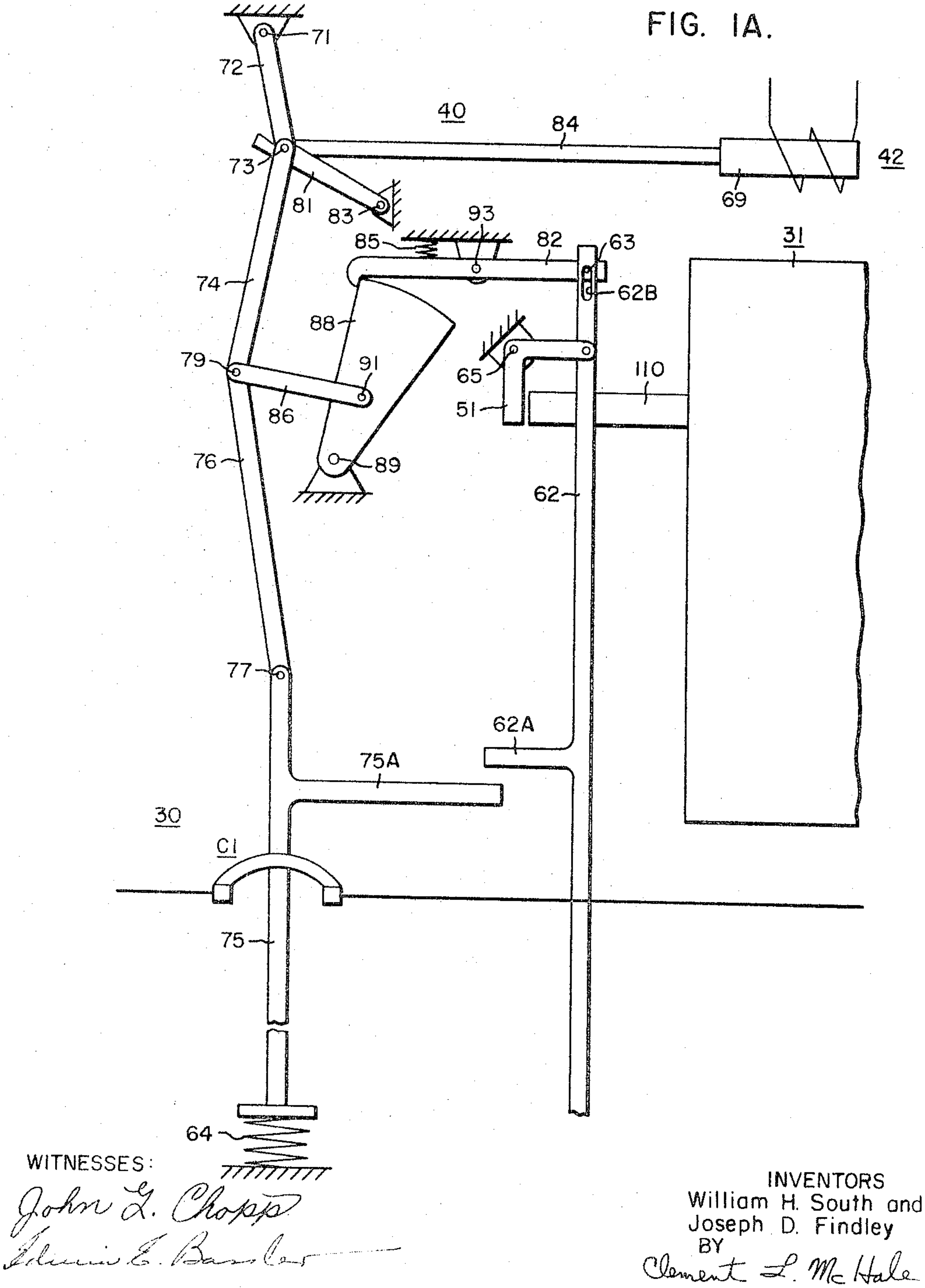
FIGS. 1A through 1D are enlarged diagrammatic views of a portion of the circuit breaker shown in FIG. 1, illustrating different operating conditions of the circuit breaker.

Referring now to the drawings and FIGS. 1 and 1A in particular, the circuit breaker 30 includes a plurality of pole units comprising the contact structures indicated generally at C1, C2 and C3 which may be connected in series with the line conductors L1, L2 and L3, respectively, of an alternating current circuit or system, as indicated at 20, and the overcurrent trip means, indicated generally at 31, 32 and 33, respectively. Each of the contact structures C1, C2 and C3 comprises a stationary contact structure and a movable contact structure which is normally maintained in the closed position by an operating mechanism indicated generally at 40.

The operating mechanism 40 includes a connecting rod 75 which extends across all three poles of the circuit breaker 30 and which is operatively connected to the moving contact structures of all three pole units so that upon operation of the rod 75, the movable contact structures of all three poles move substantially simultaneously and in unison. The operating mechanism 40 also includes the compression spring 64 which biases the movable contact structures of the contact means C1, C2 and C3 toward the open circuit position.

An operating linkage comprising the toggle links 72, 74 and 76 is provided to hold the rod 75 and consequently the movable contacts of the contact structures C1, C2 and C3 in the closed positions and to operate the movable contacts to open and closed positions. The toggle link 76 is pivotally connected to the rod 75 by a pivot pin 77 and the toggle link 74 is connected by a knee pivot pin 79 to the toggle link 76 and by a knee pivot pin 73 to the toggle link 72. The toggle link 72 is pivotally mounted on a fixed pivot 71. The operating linkage which includes the toggle links 72, 74 and 76 comprises two toggles, one of which 74, 76 functions as a tripping toggle and the other 72, 74 as a closing toggle. The tripping toggle 74, 76 is normally slightly underset above a line drawn through the pivot pins 73, 77 and the closing toggle 72, 74 is normally underset below a line drawn through the pivots 71, 79.

The tripping toggle 74, 76 is normally biased in a direction to cause its collapse by a component of force of the spring 64 which biases the movable contact structures for the several poles of the breaker in an opening direction and biases the connecting rod 75 in an upward direction. The tripping toggle 74, 76 is normally prevented from collapsing by means of a main latch member 88 pivoted on the fixed pivot pin 89 and connected by a link 86 to the knee pin 75 of the tripping toggle 74, 76, the link 86 being pivotally connected to the latch member 88 by a pivot pin 91. The main latch member 88 is held in a latching position by an intermediate latch lever 82 which is pivotally supported on a fixed pivot pin 93. The latch lever 82 carries a latch portion which normally engages the main latch 88 to releasably restrain or maintain the main latch 88 in a holding position. The latch lever 82 is biased in a counter-clockwise direction to its latching position by a compression spring 85. A common trip bar 62 is operatively connected to one end of the latch lever 82 and extends across all of the poles of the circuit breaker 30. The trip bar 62 includes a lost motion slot 62B through which a pivot pin 63 mounted on the latch lever 82 passes and a laterally projecting portion 62A which is engageable by a projecting portion 75A provided on the connecting rod 75 during certain operating conditions, as shown in FIGS. 1 and 1A. The pole units of the breaker 30 include the rocker arms or actuating members 51, 52 and 53, respectively, which are pivotally supported on the associated fixed pivots 65, 66 and 67, respectively, and pivotally connected to the common trip bar 62 adjacent to the associated overcurrent tripping devices 31, 32 and 33, respectively.

As long as the main latch 88 is held in a latching position by the latching mechanism just described, the tripping toggle links 74, 76 will, through the link 86, be held in the position shown in FIGS. 1 and 1*A* in which the breaker contacts are held in the closed circuit position. The closing toggle 72, 74 is normally biased in a direction to cause its collapse by a spring (not shown) but is normally prevented from collapsing by a shouldered support member 81 pivoted on the fixed pivot pin 83 and biased by a spring means (not shown) into supporting engagement with the knee pin 73 of the closing toggle 72 and 74. In order to automatically close the circuit breaker 30, a closing solenoid 42 is provided. The solenoid 42 includes a movable armature 69 which is attached to one end of an operating rod 84 which extends to the left and has its left end, as viewed in FIG. 1, pivotally connected to the knee pivot pin 73 of the closing toggle 72, 74. The closing solenoid 42 also includes an energizing coil which may be energized to close the circuit breaker 30 either manually or automatically by closing a suitable switch (not shown).

Figure 1B:
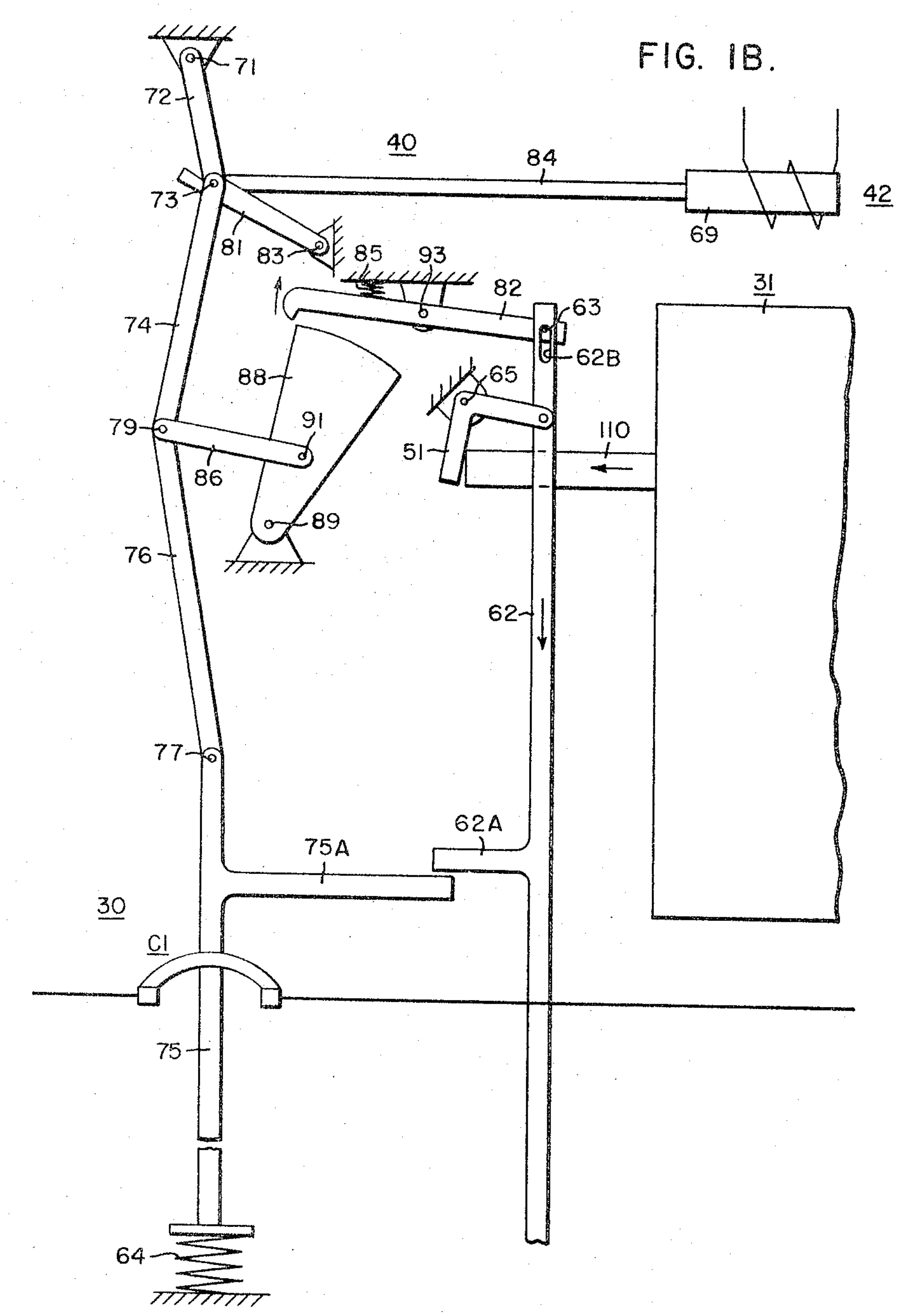

In general, all of the contacts of the circuit breaker 30 are automatically tripped open by operation of any one of the tripping devices 31, 32 and 33 associated with any one pole of the breaker. Assuming the circuit breaker 30 to be in the closed and latched position shown in FIGS. 1 and 1A, with the support member 81 supporting the closing toggle 72, 74 in its extended thrust transmitting position, the breaker 30 is automatically tripped open when one of the movable operating members 110 of one of the tripping devices 31, 32 or 33 moves to the left to actuate one of the rocker arms 51, 52 or53, respectively. When the movable operating member 110 associated with one of the tripping devices 31, 32 or 33 moves to the left, one of the associated rocker arms 51, 52 or 53, respectively, will be actuated to rotate in a clockwise direction about fixed pivot and the common trip bar 62 will be actuated to move in a downward direction to thereby rotate the latch lever 82 in a clockwise direction about its fixed pivot 93 against the force exerted by the spring 85, as best shown in FIG. 1B. When the latch lever 82 rotates in a clockwise direction, the main latch 88 will be released whereupon the force exerted by the spring 64 which biases the rod 75 upwardly and the operating mechanism 40 in an opening direction and which is transmitted through the rod 75, will cause the tripping toggle 74, 76 to collapse to the left, as shown in FIG. 1C, and effect opening movement of the movable contacts of all of the poles of the breaker 30.

Figure 1C:
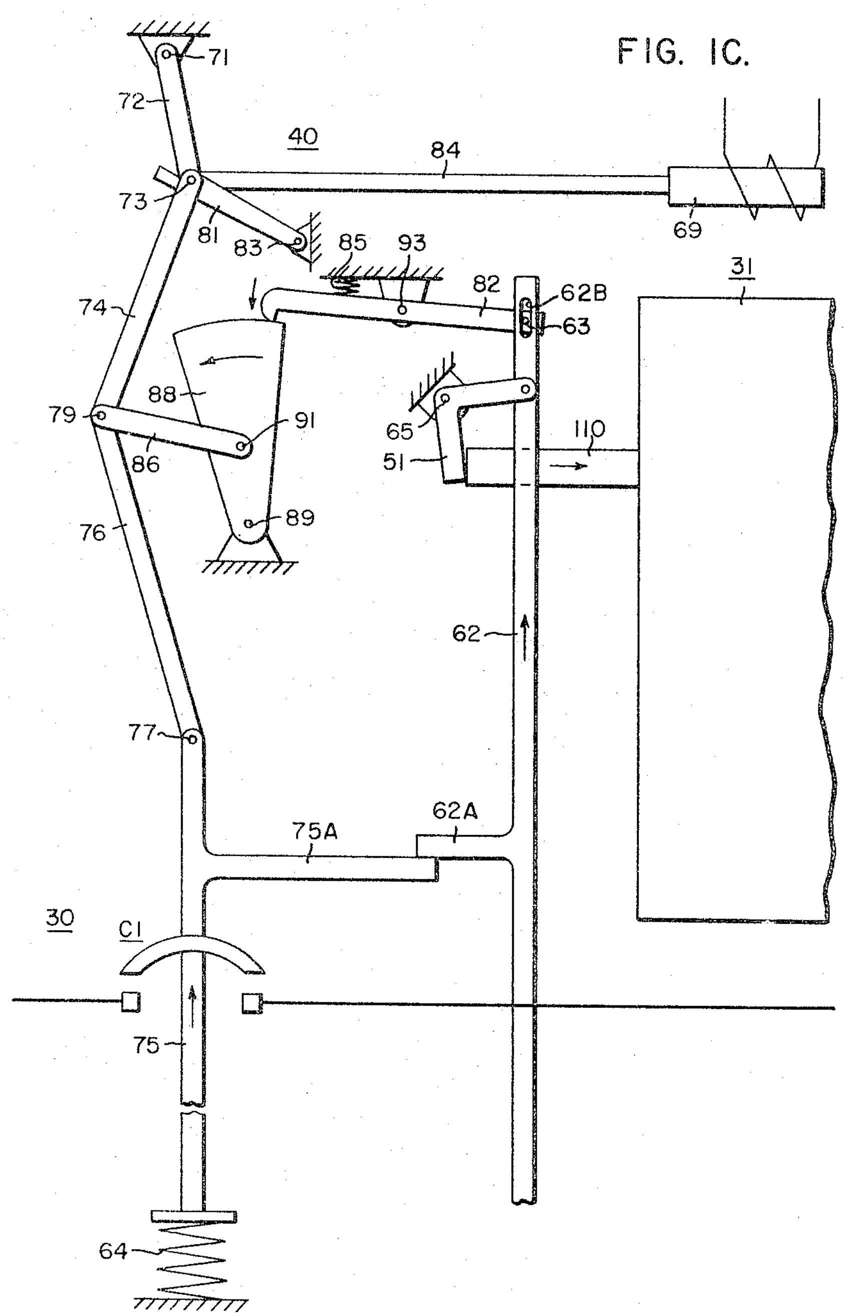

The closing toggle 72, 74 does not immediately collapse following a release of the latch mechanism since it is held by the support member 81 as shown in FIG. 1C. During the collapsing movement of the tripping toggle 74, 76, the toggle link 74 rotates clockwise about the pivot pin 73, as viewed in FIG. 1C, causing a projection (not shown) formed on the link 74 to engage and move the support member 81 to disengage the shoulder thereon from beneath the pin 73 whereupon the closing toggle 72, 74 collapses toward the right under the bias of the spring (not shown) which biases the closing toggle 72, 74 towards the collapsed condition. Collapse of the closing toggle 72, 74 with the pivot pin 73 moving to the right causes movement of the pivot pin 79 of the tripping toggle 74, 76 to the right and movement of the main latch 88 clockwise to the position shown in FIG. 1D. The latch lever 82 is then rotated counterclockwise by the spring 85 to the position shown in FIG. 1D with the pivot pin 63 on the latch lever 82 moving to near the top of the lost motion slot 62B in the trip bar 62. The operating mechanism 40 is now in condition for a closing operation.

After the breaker is tripped open as just described, the closing toggle 72, 74 collapses permitting the armature 69 of the closing solenoid to assume its unattracted position. When the closing solenoid 42 is then energized, the armature 69 is attracted to the left to thereby straighten the closing toggle 72, 74 as shown in FIG. 1A. Since at this time, the knee pivot 79 of the tripping toggle 74, 76 is restrained by the associated latching mechanism in a thrust transmitting condition the thrust of straightening the closing toggle 72, 74 is transmitted through the tripping toggle 74, 76 to actuate the rod 75 in a downward direction to close the contacts of the breaker 30. As the knee pin 73 of the closing toggle 72, 74 arrives at the fully closed position as shown in FIG. 1A, the support member 81 is moved by the associated bias spring (not shown) into supporting engagement with the knee pin 73 to thereby maintain the contacts of the breaker 30 closed.

It is to be noted that the contacts of the breaker 30 may be manually tripped open by actuating the latch lever 82 manually to disengage the latch lever 82 from the main latch 88 to thereby permit the spring 64 to collapse the tripping toggle 74, 76 and may be manually closed by manually actuating one of the closing toggle links 72 or 74 to straighten the closing toggle after the breaker 30 has been tripped open.

In general, the tripping devices or control devices 31, 32 and 33 are responsive to predetermined overload currents flowing in the contacts of the associated pole unit of the breaker 30, as sensed by the current transformer CT1, CT2 and CT3, respectively, which are disposed in inductive relationship with the line conductors L1, L2, and L3, respectively, to automatically trip the breaker 30 open after a predetermined time delay which varies with the magnitude or value of the overload current. Each of the tripping devices 31 and 33 is identical to the tripping device 32 which will be described in detail.

More specifically, the tripping device 32 comprises an induction device or timing drive motor 150 which is responsive to the current flow through the contacts of the intermediate pole of the breaker 30 to drive the shaft 164 at a speed which varies with the magnitude of said current, a driven means or integrating means 120 which is actuable or driven by the rotation of the shaft 164 of said induction device to effect the movement of a movable member 110 after a predetermined time delay which varies with the speed of said shaft, a coupling means 130 which is actuable to mechanically couple the shaft 164 of said induction device to said driven means, and an electromagnetic means or tripping electromagnet 140 which is responsive, as illustrated, to the same current as the induction device 150 for actuating the coupling means 130 to couple the shaft 164 of said induction device to said driven means when the magnitude of the current in the contacts C2 of the intermediate pole of the breaker 30 reaches a predetermined value to thereby initiate the start of said predetermined time delay.

Figure 2:
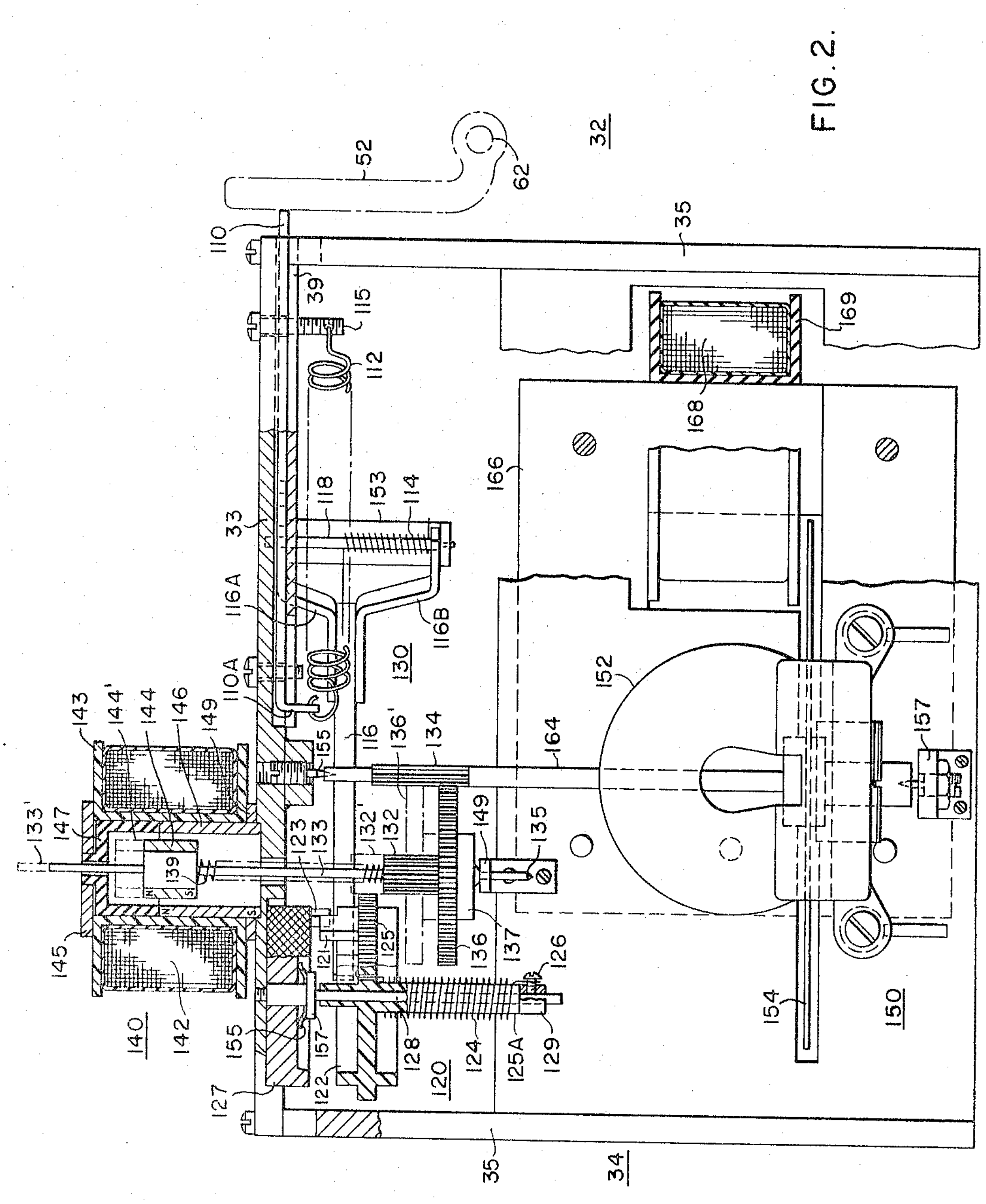
FIG. 2 is an elevational view, partly in section, of the time delay tripping means included in the circuit breaker shown in FIG. 1.
Figure 3:
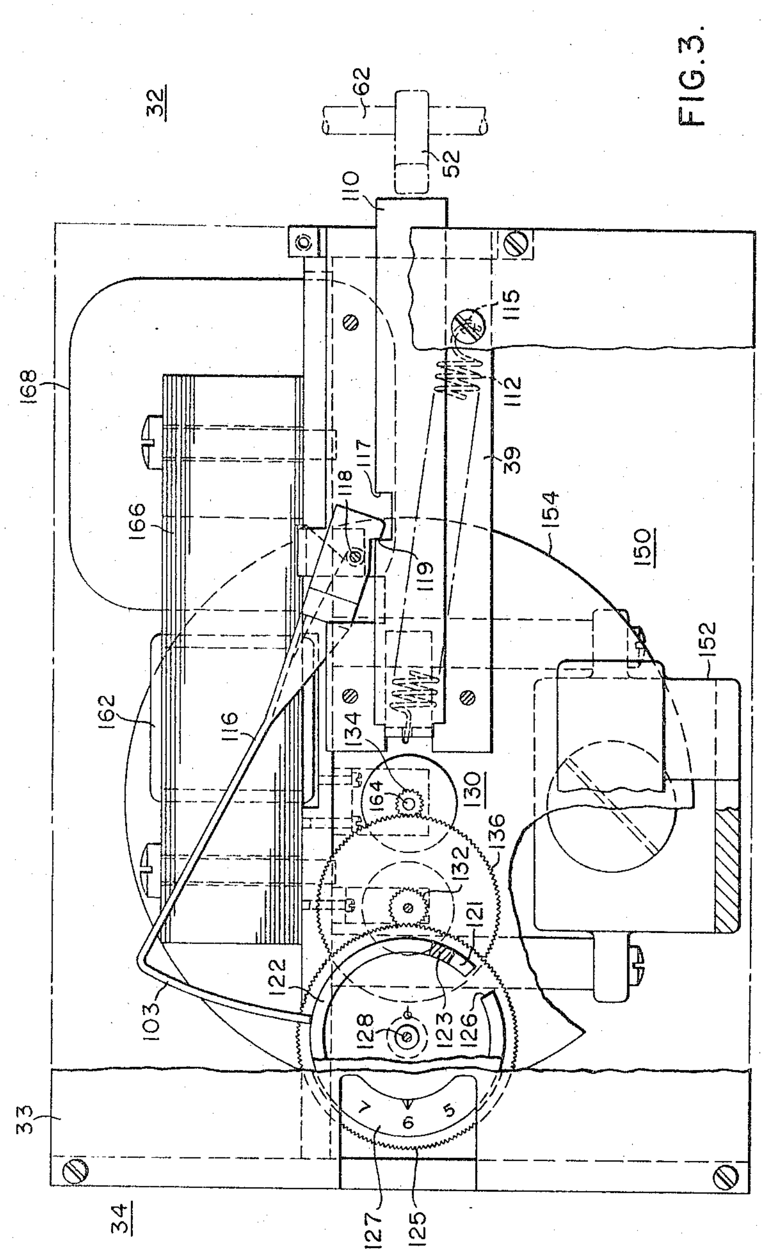
FIG. 3 is a top plan view, partly in section, of the tripping means shown in FIG. 2.

As best shown in detail in FIGS. 2 and 3, the induction device 150, along with the rest of the tripping device 32, is disposed on or supported by a supporting means or frame 34, having a top portion 33 and the side portions 35 and which is preferably formed from a nonmagnetic material, such as aluminum. The induction device 150 includes an armature or rotor member 154 formed from a highly electroconductive material, such as copper or aluminum, and preferably formed in the shape of a disc which is mounted for rotation on a shaft 164 which is rotatably supported between the upper and lower bearings 155 and 157, respectively, which, in turn, are mounted on or supported by the frame 34, as best shown in FIG. 2. In order to effect movement of the disc 154, the induction device 150 also includes a generally C-shaped magnetic structure 166, preferably formed of a plurality of laminations of any suitable soft magnetic material. The magnetic structure 166 includes an air gap in which a portion of the disc 154 is positioned. A suitable exciting winding 168 is disposed on a supporting spool or bobbin 169 and surrounds a portion of the magnetic structure 166 to establish, when energized, a magnetomotive force which directs magnetic flux through the magnetic structure 166, the associated air gap and the portion of the disc 154 which is disposed in the air gap. The winding 168 is connected for energization by the current in the line conductor L2 by means of the current transformer CT2, with the winding 168 being connected in this instance in series circuit relation with the winding 242 of the electromagnetic means 140 across the output of the current transformer CT2.

In order to establish a shifting magnetic field in the air gap of the induction device 150 for effecting rotation of the disc 154 and for providing an output torque at the shaft 164 in response to energization of the winding 168, an electroconductive shading coil 162 is positioned to link a portion of the magnetic flux which passes through the magnetic structure 166. When the winding 168 is energized, a shifting magnetic field is established which effects rotation of the disc 154 and the shaft 164 in a clockwise direction as viewed from the upper end of the shaft 164.

In order to exert a retarding or damping torque on the disc 154 which is proportional to the speed of rotation of said disc, a permanent magnet 152 having an air gap is disposed adjacent to the disc 154 with a portion of the disc 154 passing through the air gap of the permanent magnet 152 which is supported on the frame 34 by suitable screws or bolts.

In the operation of the induction device 150, the driving torque acting on the disc 154 due to the current flow in the winding 168 and, in turn, to the current conductor L2, and the contacts C2 is substantially proportional to or varies with the square of the magnitude of the current which flows in the contacts C2 and the line conductor L2, while the retarding torque acting on the disc 154 is proportional to the speed of rotation of said disc. The speed of rotation of the disc 154 and the speed of the shaft 164 of the induction device 150 also varies with or is substantially proportional to the square of the current provided by the current transformer CT2 and the current in the line conductor L2. It is to be noted that when the winding 168 is energized by the current output from the current transformer CT2 and current is flowing in the line conductor L2, the disc 154 will rotate continuously so long as the driving torque exerted on the disc 154 exceeds any frictional torque which may be present.

In order to mechanically couple the output torque of the induction device 150 to the driven means or integrating means 120, the releasable coupling means 130 is operatively interposed between the induction device 150 and the driven means 120. The coupling means 130 comprises the gears 134, 136, 132 and 125. The gear 134 is mounted on or formed integrally with the output shaft 164 of the induction device 150 for rotation therewith. The gear 136 is slidably and rotatably supported on the shaft 133 of the electromagnetic means 140 to engage the gear 134, with the gear 134 extending axially or longitudinally along the output shaft 164 of the induction device 150 to permit limited axial movement of the gear 136 along the shaft 133, while the gear 136 remains engaged with the gear 134. The gear 132 which has a lesser number of teeth than the gear 136 is also disposed on the shaft 133 for slidable and rotary movement with respect to the shaft 133 and is secured to or formed integrally with the gear 136 for movement therewith. A collar member 137 may be secured to or formed integrally with the bottom of the gear 136 for axial and rotary movement therewith to bear against the lower supporting bearing 149 to establish the lowermost operating position of the gear 136 and the associated gear 132. In order to permit axial movement of the gear 132 by the electromagnetic means 140, as will be explained hereinafter, the spring 139 is disposed on the shaft 133 with the lower end of said spring being secured to the gear 132 by any suitable means, such as a set screw (not shown) and with the upper end of said spring being secured to the movable member or armature 144 of the electromagnetic means 140 by any suitable means, such as a set screw (not shown). The gear 125 of the coupling means 130 is rotatably supported on the fixed or stationary shaft 128 which in turn is supported by or secured to the top portion 33 of the frame 34. The gear 125 includes an axially extending portion 125A having a smaller diameter than the gear 125 through which the shaft 128 also passes and which bears against the collar member 129. The collar member 129 acts as a lower bearing support for the gear 125 and is secured to the shaft 128 by suitable means, such as the set screw 126. It is to be noted that the shaft 128 on which the gear 125 rotates is substantially parallel to and spaced from the shaft 133 about which the gear 132 rotates and that in the normal operating position of the gears 125 and 132, the gears 125 and 132 are axially spaced from one another so that said gears are not engaged.

In the operation of the releasable coupling means 130, whenever the value of the current in the contacts C2 of the breaker 10 and in the line conductor L2 is sufficient to rotate the output shaft 164 of the induction device or driving means 150 to thereby rotate the gear 134, the gear 136 which engages the gear 134 will also be driven by the induction device 150 to rotate along with the associated gear 132. Since, however, in the normal operating condition of the coupling means 130, as shown in FIG. 2, the gears 132 and 125 are spaced from one another and disengaged with respect to one another, no rotation will be applied to the driven means or integrating means 120. When the electromagnetic means 140 actuates the gears 132 and 136 in an upward direction during certain operating conditions of the tripping means 32, the gear 132 will engage the gear 125 and the rotation of the induction device 150 will be transmitted from the output shaft 164 and the gear 134 through the gears 132 and 136 to the gear 125 and to the driven or integrating means 120.

In order to mechanically couple the rotation of the induction device 150 to the driven means 120 when the current through the line conductor L2 and the contacts C2 of the intermediate pole of the breaker 30 increases to or reaches a predetermined magnitude or value, the electromagnetic means or current pick-up device 140 is provided. As best shown in FIG. 2, the electromagnetic means 140 includes an energizing winding coil 142 which is disposed on an insulating spool or bobbin 143 which, in turn, is secured to or supported on the top portion 33 of the frame 34 by the generally U-shaped bracket or supporting member 145 which is formed from a soft magnetic material and serves as the outside yoke of the stationary magnetic structure of the electromagnetic means 140. A connecting insert member 149 is disposed between the top portion 33 of the frame 34 and the bracket 145 and is formed from a soft magnetic material. The position of the member 149 is rotatably adjustable to vary the reluctance of the magnetic circuit formed with the bracket 145 to calibrate the pick-up device 140. The energizing winding 142 of the electromagnetic means 140, as shown in FIG. 1, is electrically connected in series circuit relation with the energizing winding 168 of the induction device 150, said series circuit being connected across the output of the current transformer CT2 to be responsive to the current which flows in the line conductor L2 and in the contacts C2 of the intermediate pole of the breaker 30. The electromagnetic means 140 also includes the first and second cylindrical magnetic members 144 and 146, respectively, which are formed from any suitable soft magnetic material and disposed in substantially concentric relation with respect to one another. The magnetic member 146, which is tubular in form is disposed in the central opening which extends through the winding 142 and is supported in and positioned by a counterbore or recess provided in the frame 34, as shown in FIG. 2. The upper guide bearing 147, which is formed from a non-magnetic material, provides one magnetic gap in the magnetic structure of the electromagnetic means 140, and is disposed around the upper end of the shaft 133. The guide bearing 147 is held in position by the insulating spool 143 and the bracket member 145. The magnetic member or armature 144 is fixed to the shaft 133 for movement therewith and is axially movable with respect to the magnetic member 146. It is to be noted that in the normal operating condition of the electromagnetic means 140, the position of the movable magnetic member 144 is axially displaced with respect to the position of the stationary magnetic member 146 when the magnitude of the current flowing in the contacts C2 of the intermediate pole of the breaker 30 is less than the predetermined value previously mentioned.

In order to permit the electromagnetic means 140 to actuate the coupling means 130 to mechanically couple the induction device 150 to the driven means 120 when the magnitude of the current in the contacts C2 reaches a predetermined value, the spring 139 is secured at the upper end to the movable magnetic member 144 and at the lower end to the gear 132 of the coupling means 130 to limit the force which is transmitted from the electromagnetic means 140 to the gear 132 to raise the gear 132 into an engaged position with respect to the gear 125. When the movable magnetic member 144 is raised to the position indicated in phantom at 144′ in FIG. 2, the resiliency of the connecting spring 139 limits the force applied by the gear 132 to the gear 125 and permits a slight rotation of the gear 132 prior to complete engagement of the gears 132 and 125 so that the teeth of the respective gears are properly aligned to reduce the wear on said gears.

Figure 7:
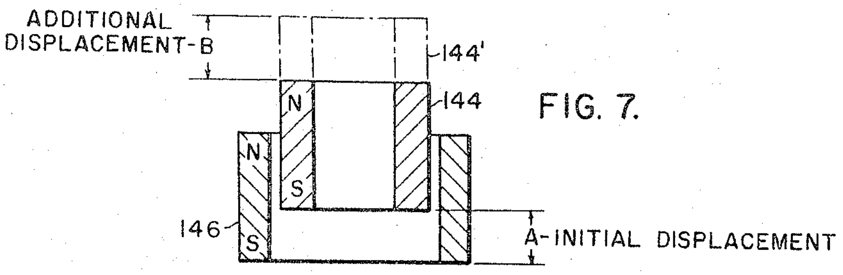
FIG. 7 is an elevational view in section of a portion of the tripping means shown in FIGS. 2 and 3.

In the operation of the electromagnetic means 140 when the conductor turns of the winding 142 are energized by the current flow from the current transformer CT2, a magnetomotive force is established which magnetizes both of the magnetic members 144 and 146 with like magnetic poles being disposed adjacent to one another, as indicated in FIGS. 2 and 7. Since the magnetic members 144 and 146 are axially displaced from one another in the normal operating condition of the electromagnetic means 140 by an axial distance indicated at A in FIG. 7, when the magnetic members 144 and 146 are magnetized by the energization of the winding 142 there is a tendency for the magnetic member 144 to move axially upward under the influence of the repulsion forces which result from the like magnetic poles on the magnetic members 144 and 146 being disposed adjacent to one another. In addition, there is a force of attraction tending to pull the movable magnetic member 144 in an upward direction due to the attraction between the unlike magnetic poles at the top of the stationary member 146 and at the bottom of the movable magnetic member 144, as indicated in FIG. 7. When the current in the winding 142 of the electromagnetic means 140 increases to a predetermined value which varies with the initial displacement between the magnetic members 144 and 146, it has been found that the movable magnetic member 144 will move upwardly with a snap action to a position indicated in phantom at 144' in FIG. 7 which is displaced axially from the magnetic member 146 by an additional distance, indicated at B in FIG. 7.

Figure 8:
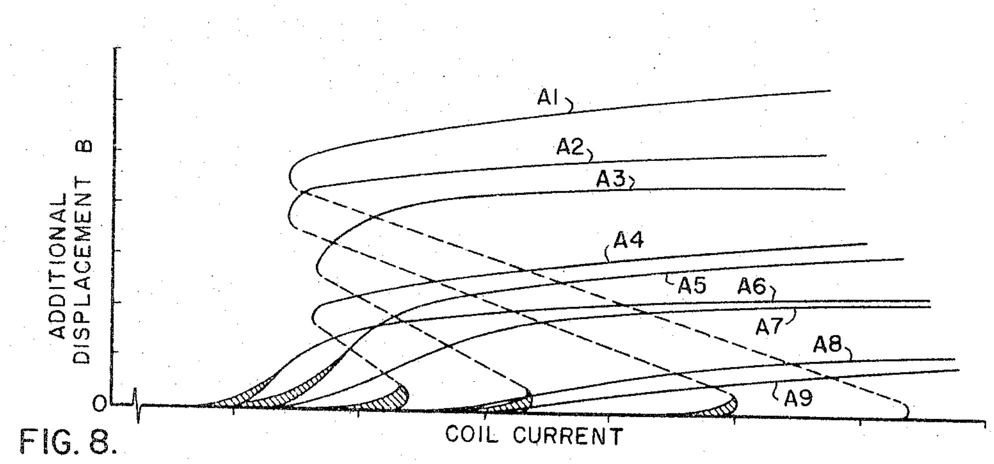
FIG. 8 is a set of curves illustrating the operation of the portion of the tripping means shown in FIG. 7.

Referring to FIG. 8, the snap acting operation of the electromagnetic means 140 may be more clearly understood by observing the additional displacement B of the movable magnetic member 144 which results when the current applied to the energizing winding 142 from the current transformer CT2 is gradually increased and finally exceeds the predetermined value at which the magnetic member 144 moves with a snap action from the lower stable position, indicated at 144 in FIG. 7 to the upper position indicated in phantom at 144' in FIG. 7 for various values of initial displacement as indicated by the curves A1 through A3 in FIG. 8. The curve A1 is plotted for a relatively small value of initial displacement and shows the relatively larger additional displacement B which results when the predetermined current is exceeded in the winding 142. The curves A2 through A9 illustrate the effect of increasing values of different initial displacements and indicate the relatively smaller additional displacements which occur as the current in the energizing winding 142 is gradually increased for greater values of initial displacement. It is to be noted that for different values of initial displacement as indicated by the curves A1 through A4, the electromagnetic means 140 operates with a snap action or in a bistable manner since the movable magnetic member 144 remains in a substantially stable lower position until the predetermined current through the winding is exceeded and then moves rapidly with a snap action to the position indicated in phantom at 144' in FIG. 7. As previously mentioned when a very high overload current occurs in the contacts C2, the resilient connection between the gear 132 and the movable member 144 provided by the spring 139 limits the force between the gears 132 and 125 to substantially a predetermined value to reduce the wear that might otherwise result if the teeth of said gears were not properly aligned at the instant of initial contact between said gears since the spring 139 limits said force and permits the gear 132 to rotate slightly into proper alignment with the gear 125 when the gear 132 is actuated upwardly by the electromagnetic means 140. As shown in the curves of FIG. 8, the initial displacement between the magnetic members 144 and 146 may be selected to insure the desired snap acting movement of the movable member 144 when a predetermined value of current occurs in the contacts C2 of the breaker 30. It is important to note that the difference between the predetermined current required to produce the snap acting movement of the member 144 which actuates the coupling of the driving means 150 to the driven means 120 and the decreased current at which the member 144 will return to its normal operating position can be made much less than in a conventional tripping means. In other words, the difference between the pick-up current and the drop-out current of the electromagnetic means 140 is relatively small compared with the operating characteristics of a conventional tripping means of the type previously mentioned. The shaded areas in the lower portion of the curves A2 through A6 indicates a slight variation in the predetermined current required in the energizing winding 142 to produce the snap acting movement of the movable member 144 for certain values of initial displacement.

In general, the driven means or integrating means 120 is provided to actuate or release the movable member 110 for movement to effect the release of the operating mechanism 140 and the tripping of the breaker 30 after the induction device 150 is coupled to the driven means 120 by the coupling means 130 in response to the actuation of the electromagnetic means 140 and after a predetermined time delay has elapsed which varies with the magnitude or value of the current in the contacts C2 of the breaker 30 and the corresponding speed of the output shaft 164 on the induction device 150. More specifically, the driven means or integrating means 120 comprises a notched or slotted integrating wheel 122 and a latching member 116 which is normally held in the latched position to latch movable member 110 in the position, shown in FIGS. 1 and 3, which corresponds to the closed circuit position of the contacts of the breaker 30 against the force exerted on the movable member 110 by the biasing spring 112.

In particular, the integrating wheel or disc 122 of the driven means 120 is secured to or formed integrally with the gear 125 of the coupling means 130 for rotation therewith about the stationary shaft 128 when the coupling means 130 mechanically couples the induction device 150 to the gear 125 and to the integrating wheel 122 in response to actuation of the coupling means 130 by the electromagnetic means 140. The integrating wheel 122 includes an opening or slot in the outer periphery thereof, as indicated at 126 in FIG. 3, through which one end of the latch member 116 is disposed to pass in predetermined operating position of the integrating wheel 122. The integrating wheel 122 also includes an upwardly projecting portion 121 at the outer periphery thereof adjacent to the slot 126 which is disposed to bear against or engage a stop member 123 which is mounted on an adjustable calibrating disc or knob 127. The calibrating disc 127 is rotatably disposed on the shaft 128 between the underside of the top portion 33 of the frame 34 and a flange or collar member 157 which is secured to the shaft 128 with the calibrating disc 127 being biased to bear frictionally against the underside of the top portion 33 of the frame 34 by the biasing leaf spring 155 which is also rotatably disposed on the stationary shaft 128. As best shown in FIG. 3, the position of the stop member 123 may be calibrated or adjusted relative to a stationary pointer provided in the top portion 33 of the frame 34 by observing the position of the numerical markings which are provided on top of the calibrating disc 127 with respect to said pointer. In order to reset the integrating wheel 122 to a predetermined position following rotary movement of the integrating wheel 122 which results when the gear 125 engages the gear 132 and is driven by the induction device 150, a torsion spring 124 is disposed on the axially extending portion 125A of the gear 125. The lower end of the spring 124 is secured to shaft 128 by the set screw 126 and the upper end is secured to the gear 125 through an opening therein.

The driven means 120 also includes the generally L-shaped latch member 116 which is rotatably supported on the stationary shaft or pivot pin 118 which, in turn, is secured to and supported by the top portion 33 of the frame 34, as best shown in FIG. 3. The shorter portion 103 of the latch member 116 is normally disposed to bear against the outer periphery of the integrating wheel 122 at a point which is circumferentially spaced or displaced from the opening 126 in said integrating wheel. The other end of the latch member 116 is bifurcated and includes the spaced arms 116A and 116B, which are both rotatably supported on the pivot pin 118, as shown in FIG. 2. In order to provide a lower bearing support for the latch member 116, the bracket member 153 is secured to and supported by the top portion 33 of the frame 34 and includes a lower portion through which the pivot pin 118 passes and against which the lower arm 116B of the latch member 116 bears. In order to bias the latch member 116 away from engagement with the outer periphery of the integrating wheel 122 during certain operating conditions or to bias the latch member 116 in a clockwise direction about the pivot pin 118, as viewed in FIG. 3, the torsion spring 114 is disposed on the pivot pin 118 with the upper end of said torsion spring bearing against the latch member 116 and with the lower end of said torsion spring bearing against the bracket member 153. The upper arm 116A of the latch member 116 includes a shoulder portion or notch 119 which is disposed to engage a slot or recess 117 in the movable member 110 to maintain said movable member in the position shown in FIGS. 1, 3 and 4 against the force of the biasing spring 112 when the contacts of the breaker 30 are closed.

Figure 4:
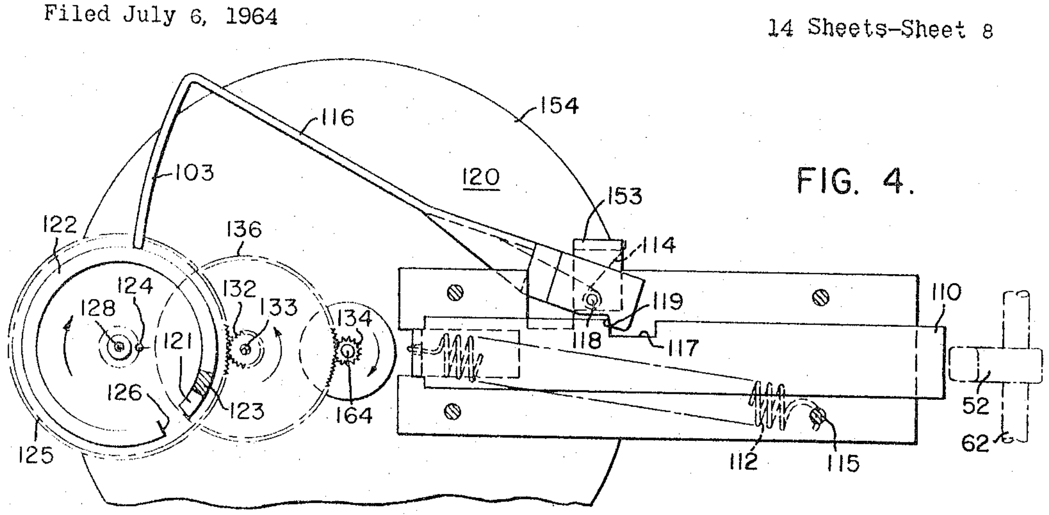
FIGS. 4–6 are top plan views of a portion of the tripping means shown in FIGS. 2 and 3, illustrating different operating conditions of the tripping means.

In order to actuate the movable member 110 from the position shown in FIGS. 1, 3 and 4 to move toward the right as viewed in FIGS. 2, 3 and 4 and to actuate the rocker arm 52 which in turn moves the common trip bar 62 to effect tripping of the breaker 30, the biasing spring 112 is connected between a depending portion 110A of the movable member 110 and a stationary post 115 which is supported by the top portion 33 of the frame 34, as best shown in FIG. 2. In order to slidably support the movable member 110 and to guide and limit its movement with respect to the top portion 33 of the frame 34, the supporting member 39 is disposed underneath the movable member 110 and is secured to the top portion 33 of the frame 34 by suitable means, such as bolts or screws. It is to be noted that the spring 112 exerts a force on the latch member 116 through the movable member 110 since one edge of the recess or slot 117 of the movable member 110 bears against the shoulder portion 119 of the latch member 116 and biases the latch member 116 in a counterclockwise direction about the pivot pin 118 against the force applied to the latch member 116 by the torsion spring 114 to bear against the outer periphery of the timing wheel 122, as viewed in FIG. 4.

In the operation of the driven means or integrating means 120, when the contacts of the breaker 30 are closed, the driven means 120 is in a latched condition and the movable member 110 is in the position shown in FIGS. 2, 3 and 4. At this time, it is assumed that the current in the contacts C2 and in the line conductor L2 is less than the predetermined value at which the electromagnetic means 140 actuates the coupling means 130 to couple the induction device 150 to the driven means 120. The gears 132 and 125 of the coupling means 130 are therefore disengaged and no torque is being transmitted from the induction device 150 to the integrating wheel 122 of the driven means 120. It is to be noted at this time that the gears 132 and 136 are being driven or rotated by the induction device 150 assuming that there is an output torque at the shaft 164 of the induction device 150. When the predetermined value of current is reached in the contacts C2 of the breaker 30, the electromagnetic means 140 will actuate the gear 132 in an upward direction to engage the gear 125 to thereby couple the integrating wheel 122 to the output of the induction device 150. As best shown in FIG. 4, the output shaft 164 will then be rotating in a clockwise direction to drive the gears 132 and 136 which will then rotate in a counterclockwise direction about the shaft 133 and further actuate the gear 125, as well as the integrating wheel 122, to rotate in a clockwise direction about the shaft 128. Prior to the coupling of the gear 125 to the induction device 150, the integrating wheel 122 will be held in a predetermined position by the resetting spring 124 which will bias the projecting portion 121 of the integrating wheel 122 against the adjustable stop 123, as shown in FIG. 4. When the gear 125 and the integrating wheel 122 are driven in a clockwise direction about the shaft 128, the opening 126 will then rotate from the position shown in FIG. 4 until the opening 126 is opposite the short portion 103 of the latch member 116 which is biased against the integrating wheel 122 in a counterclockwise direction about the pivot pin 118, as viewed in FIG. 4. When the opening 126 is rotated into a position opposite the short portion 103 of the latch member 116, the latch member 116 will then rotate in a counterclockwise direction to the position shown in FIG. 5 under the influence of the force of the biasing spring 112 exerted through the movable member 110, and the movable member 110 will thereby be released for movement to the right to the position shown in FIG. 5 under the influence of the biasing spring 112. The latter movement of the movable member 110 will actuate the rocker arm 52 to move the common trip bar 62 in a downward direction, as shown in FIG. 1, and the operating mechanism 40 of the breaker 30 will be unlatched or released to thereby open the contacts C1, C2 and C3 of the breaker 30 under the influence of the biasing spring 64. It is to be noted that when the induction device 150 is coupled to the driven means 120 by the coupling means 130 as actuated by the electromagnetic means 140, a predetermined time delay is introduced between the time that the driven means 120 is coupled to the induction device 150 and the time at which the latch member 116 is released due to the time required for the integrating wheel 122 to rotate the opening 126 from the position shown in FIG. 4 to the final position shown in FIG. 5 at which time the latch member 116 is released for movement in the counterclockwise direction about the pivot pin 118 to release the movable member 110. Since the speed of rotation applied to the integrating wheel 122 from the induction device 150 varies with or is substantially proportional to the square of the magnitude of the current in the contacts C2 of the breaker 30, the time delay introduced by the integrating wheel 122 also varies with the square of the magnitude of the current being sensed by the current transformer CT2.

The length or duration of the time delay introduced by the integrating wheel 122 can be varied or adjusted by adjusting the position of the stop 123 on the calibrating disc 127 relative to the integrating wheel 122 since it is the position of the latter stop which determines the initial or normal operating position of the opening 126 in the integrating wheel 122 from which the opening 126 must travel or rotate to the point on the outer periphery of the integrating wheel 122 against which the latch member 116 bears. Since the coupling means 130 provides two stages of speed reduction between the speed of the induction device at the shaft 164 and the gear 125, the time delay introduced between the time at which the gears 125 and 132 are actuated to the engaged position by the electromagnetic means 140 and at the same time at which the latch member 116 is released can also be varied by changing the ratio of the gears which make up the coupling means 130.

It is to be noted that each of the tripping means 31 and 33 may also trip the breaker 30 independently of the operation of the tripping means 32 by actuating the common trip bar 62 but that all of the contacts C1, C2 and C3 of the breaker will be tripped open by the operation of any one of the tripping units 31, 32 or 33. It is also to be noted that when the contacts of the breaker 30 are automatically tripped open by the tripping means 32, as just described, the energizing current for the induction device 150 and the electromagnetic means 140 will be interrupted and the coupling means 130 will uncouple the induction device 150 from the driven means 120 when the electromagnetic means 140 is deenergized.

Figure 5:
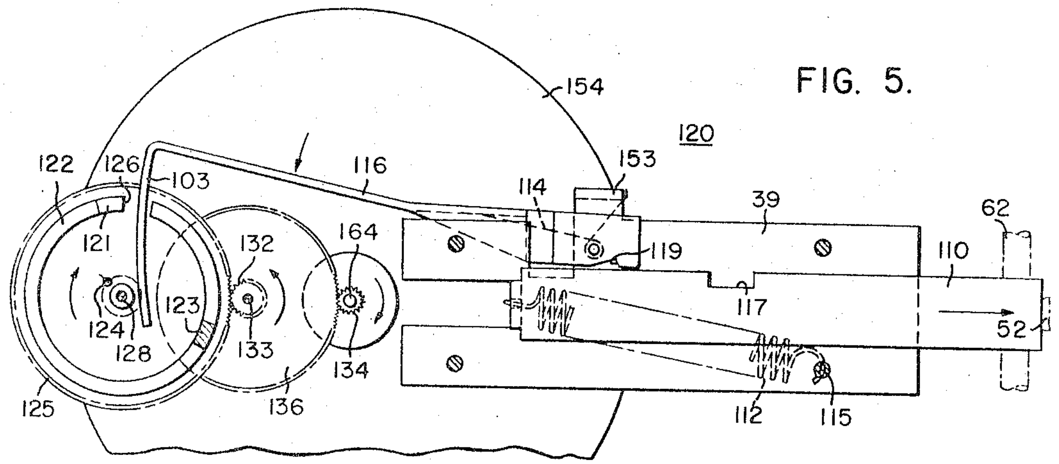
Figure 6:
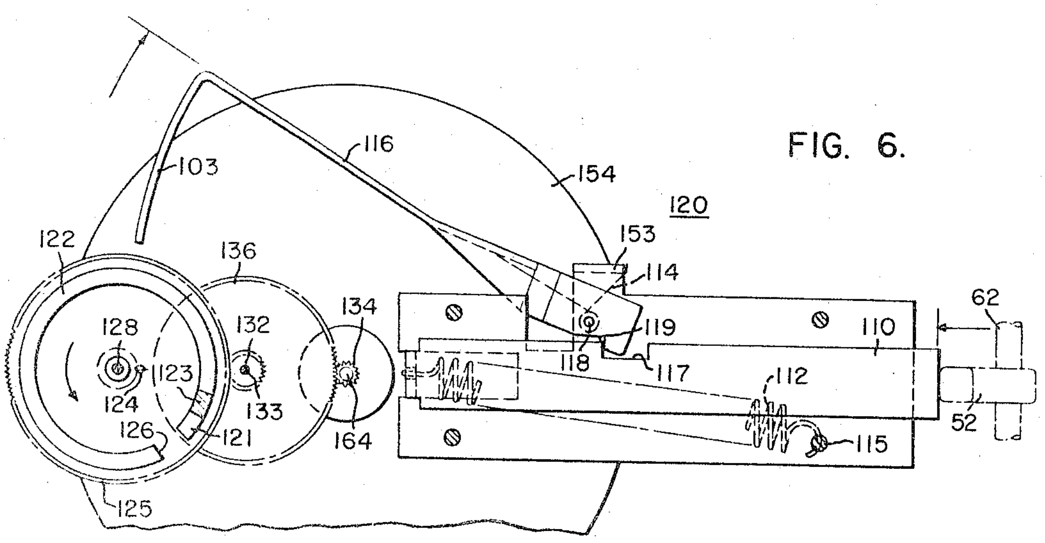

Following a tripping operation of the breaker 30 by the driven means 120 of the tripping means 31, 32, or 33, the contacts of the breaker 30 will be opened by the upward motion of the rod 75 which will also actuate the trip bar 62 in an upward direction to thereby reset the driven means 120 from the position shown in FIG. 5 to the position shown in FIG. 6.

In particular, at the end of the upward motion of the rod 75, the projecting portion 75A will engage the projecting portion 62A and actuate the trip bar 62 upwardly to the position shown in FIG. 1C. Since the closing toggle 72, 74 has not yet collapsed, the latching portion of the latch lever 82 will bear against the top of the arcuate portion of the main latch 88 which is rotated counterclockwise toward the left from the position shown in FIG. 1A during the collapse of the tripping toggle 74, 76 to the position shown in FIG. 1C. During the upward travel of the trip bar 62, the spring 85 will bias the pivot pin 63 toward the top of the lost motion slot 62B until the latching portion of the latch lever 82 engages the top of the arcuate portion of the main lever 88. As the trip bar 62 moves toward its uppermost position shown in FIG. 1C, the pivot pin 63 will be disposed momentarily near the bottom of the lost motion slot 62B, as shown in FIG. 1C, until the closing toggle 72, 74 collapses. When the closing toggle 72, 74 subsequently collapses, the main latch 88 and the latch lever 82 will be reset to the position shown in FIG. 1D. When the common trip bar 62 is actuated in an upward direction by the rod 75 to the position shown in FIG. 1C, the rocker arm 51 is rotated counterclockwise to apply a force causing the movable member 110 to move to the left, as viewed in FIG. 6, to the position indicated in FIG. 6 against the biasing force of the spring 112. It is to be noted that when the movable member 110 has been actuated to move to the right during a tripping operation of the breaker 30, as shown in FIG. 5, and when the latch member 116 is in the released position shown in FIG. 5, the latch member 116 is prevented from rotating in a clockwise direction about the pivot pin 118 under the influence of the resetting spring 114 due to the portion of the movable member 110 which is bearing against the right end of the latched member 116 and acting as a stop, as shown in FIG. 5. When the movable member 110 is actuated to slidably move to the left to the reset position indicated in FIG. 6 under the influence of the force applied by the rocker arm 52 due to the upward movement of the rod 75 in opening the contacts of the breaker 30 and actuating the trip bar 62 upward also, the recess 117 will move under the right end of the latch member 116 and permit the latch member 116 to rotate in a clockwise direction about the pivot pin 118 to the reset position indicated at 116 in FIG. 6. When the contacts of the breaker 30 are closed by the closing solenoid 42 and the rod 75 moves downwardly to the position shown in FIG. 1, the force exerted on the common trip bar 62 by the rod 75 through the projecting portion 75A and 62A will no longer be applied and the biasing spring 112 will then actuate the movable member 110 to move slightly to the right from the reset position indicated in FIG. 6, to the position shown in FIG. 4 and the latch member 116 will be rotated in a counterclockwise direction from the reset position indicated in FIG. 6 to the final position shown in FIG. 4, at which time the short portion 103 of the latch member 116 will bear against the outer periphery of the integrating wheel 122. It is to be noted that when the latch member 116 is actuated to move to the reset position indicated in FIG. 6 by the rocker arm 52 exerting a force on the movable member 110, the integrating wheel 122 will be free to rotate in a counterclockwise direction about the shaft 128 under the influence of the resetting spring 124 until the projecting portion 121 on the integrating wheel 122 bears against the adjustable stop 123 on the calibrating disc 127.

Considering now the overall operation of the tripping device 32, the contacts C1, C2 and C3 of the breaker 30 will normally be held in the latched condition with the driven means 120 of the tripping device 132 also being maintained in a latched condition to prevent the movement of the movable member 110. When the induction device 150 is energized from the current transformer CT2, an output rotation will normally be present at the shaft 164 and the gears 132 and 136 will be continuously rotating but no torque will be applied to the driven means 120 of the tripping device 32 as long as the magnitude of the current in the contacts C2 remains below the predetermined value at which the electromagnetic means 140 actuates the coupling means 130 to couple the induction device or timing drive motor 150 to the driven means 120. When the current in the contacts C2 increases to the predetermined value necessary to actuate the movable member 144 of the electromagnetic means in an upward direction and to consequently actuate the gear 132 in an upward direction to engage the gear 125, the integrating wheel 122 will rotate in a clockwise direction, as viewed in FIG. 4, until the latch member 116 is permitted to rotate in a counterclockwise direction about the pivot pin 118 and the movable member 110 will be released to move to the right and to effect the tripping of the breaker 30 after a predetermined time delay which depends upon the speed of rotation of the output shaft 164 of the induction device 150 and, in turn, upon the square of the magnitude of the current flow in the contacts C2 of the breaker 30. The time delay which is introduced by the tripping device 32 is therefore substantially inversely proportional to or varies inversely with the square of the magnitude of the current in the contacts C2 of the associated pole of the breaker 30.

It is to be noted that in the operation of the tripping device or means 32, when a predetermined overload current occurs which causes the electromagnetic means 140 to respond by actuating the coupling means 130 to couple the induction device 150 to the driven means or timing means 120 and to initiate the start of the predetermined time delay provided by the timing wheel 122, and then the overload current should drop below the predetermined value necessary to cause the electromagnetic means 140 to actuate the coupling means 130, the gears 125 and 132 will then disengage before the timing wheel 122 has reached the position necessary to release the latch member 116. The resetting spring 124 associated with the integrating wheel 122 will then rapidly rotate the integrating wheel 122 back in a counterclockwise direction about the shaft 128, as viewed in FIG. 4, to its normal operating position shown in FIGS. 2 and 3 so that when another overload condition occurs which would cause the electromagnetic means 140 to actuate the coupling means 130 to couple the induction device 150 to the driven means 120, the predetermined time delay will again start and continue for the same predetermined time delay for which the tripping means 32 is designed.

Figure 9:
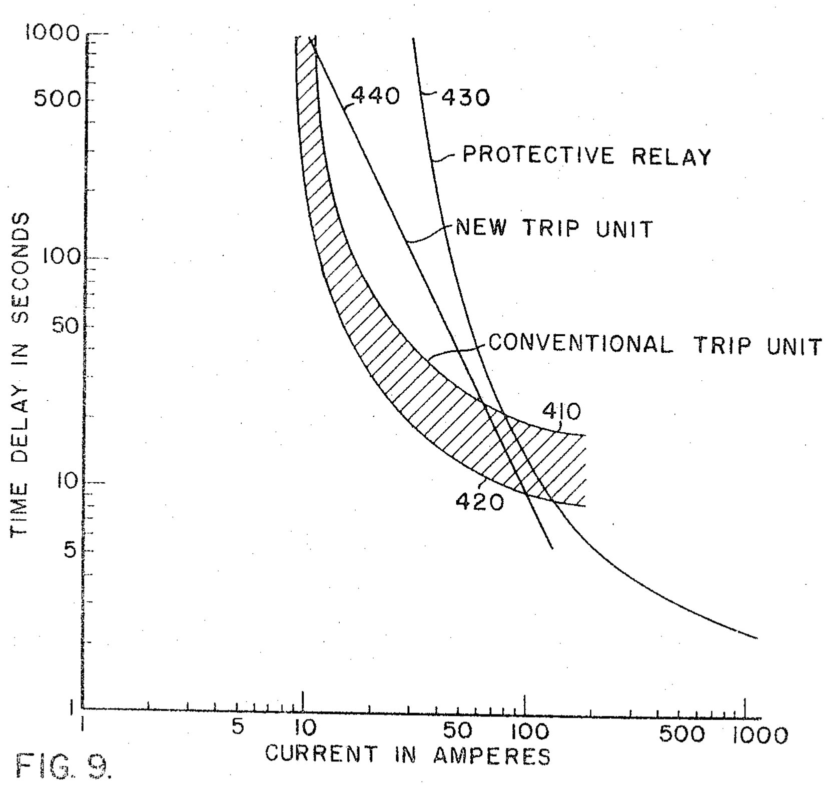
FIG. 9 is a set of curves illustrating the operation of the tripping means shown in FIGS. 2 and 3 and comparing said operation with that of certain types of conventional tripping means.

The tripping device 32 has several important advantages. For example, the driven means or integrating means 120 is normally functionally separate from the electromagnetic means or current pickup means 140 so that all of the output available from the induction or timing drive motor 150 is available to drive or actuate the driven means or integrating means 120. Another advantage of the construction of the tripping device 32 is that when the gears 132 and 136 are actuated in an upward direction by the electromagnetic means 140, the lower bearing of the shaft 133 is relieved of any vertical thrust load to thereby substantially eliminate certain frictional forces at the lower bearing of the shaft 133 which would otherwise have to be overcome by the output torque of the induction device 150 since the weight of the shaft 133 and the gears 132 and 136 is supported magnetically. This means that certain types of vibration which might otherwise be transmitted to other parts of the tripping are reduced or substantially eliminated along with the associated noise. Another advantage of the tripping device 32 is that the time delay introduced by the timing means 120 can be adjusted or varied within wide limits by adjustment of the position of the stop 123 or by changing the ratio of the gears which make up the coupling means 130. Another important advantage of the tripping device 32 is illustrated in FIG. 9, in which the curve 440 illustrates the time delay in seconds before the breaker is tripped by the operation of the tripping device 32 plotted as a function of the current in amperes through the contacts C2 of the breaker 30. The shaded area indicated between the curves 410 and 420 indicates the variation in the operation of a conventional tripping unit employing an electromagnetic means operating against a calibrating spring, while the curve 430 indicates the time-current characteristic of a conventional protective relay. It is to be noted from the curve shown in FIG. 9 that the characteristic of the tripping device 32, as indicated by the curve 440, offers a relatively precise time-current operating characteristic which more readily coordinates with other protective devices, such as fuses and protective relays in a coordinated protective system for an electrical power system. This is because for any particular value of overload current, the time to trip for a conventional tripping means will vary between the times indicated by the curves 410 and 420 while for the disclosed tripping means, the variation in time to trip the associated breaker for a particular overload current is substantially eliminated.

Figure 10:
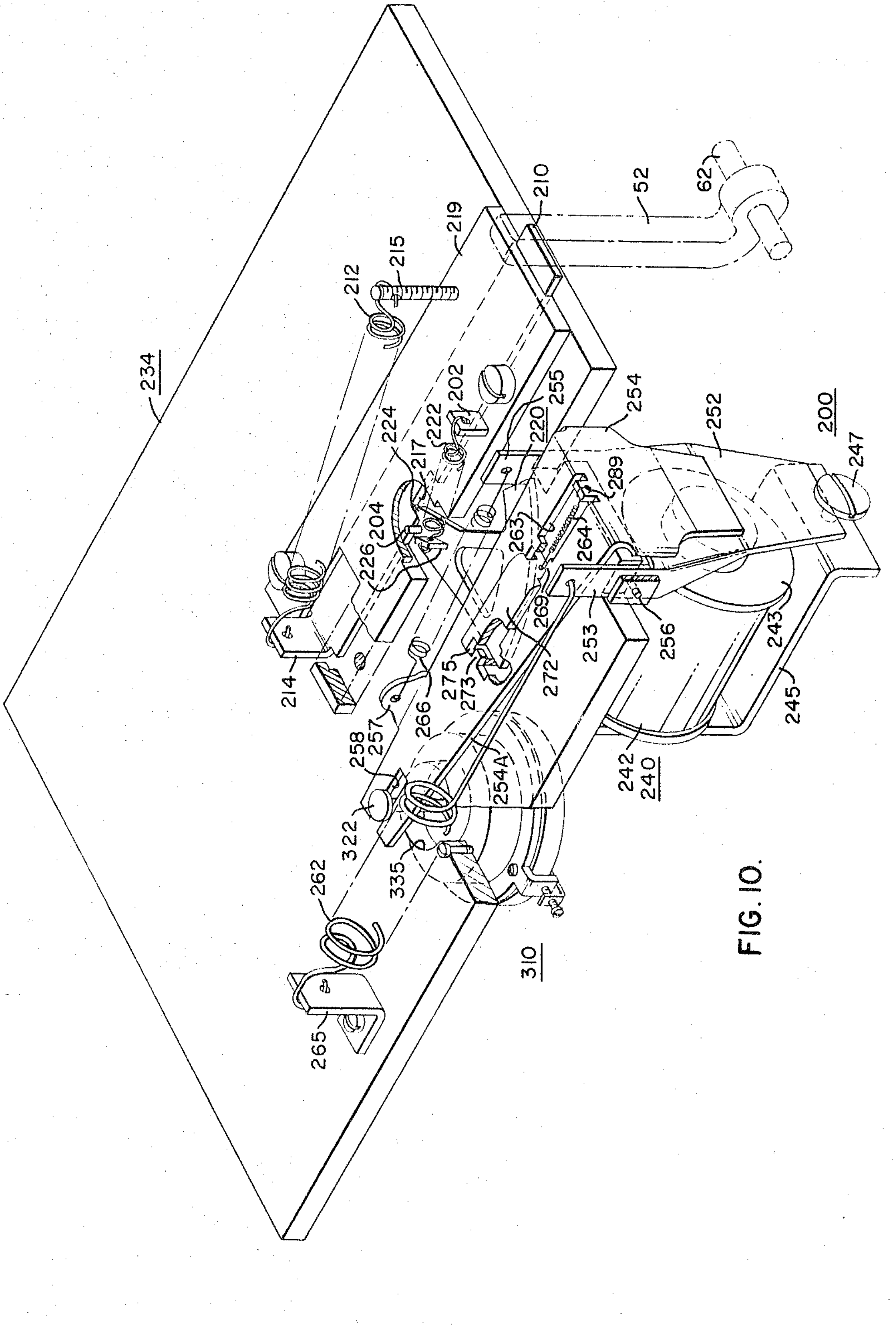
FIG. 10 is a perspective view, partly in section, of an instantaneous tripping means which may be added to or substituted for the time delay tripping means included with the circuit breaker shown in FIG. 1.

Referring now to FIGS. 10 through 15 there is illustrated an overcurrent tripping device or means 200 which is of the instantaneous type which may be substituted for each of the tripping means 31, 32 and 33 of the breaker 30 shown in FIG. 1 or which may be combined with each of the tripping devices 31, 32 and 33 to provide tripping means which are independently actuable in response to predetermined overload currents with a relatively long predetermined time delay or for higher overload currents in a substantially instantaneous manner. The tripping device or control device 200 may optionally be provided with a time delay device 310, as indicated in FIG. 10, to provide a relatively short time delay compared with the relatively longer time delay, such as provided by the tripping devices 31, 32 and 33. In general, the tripping device 200 comprises a movable member 210 which is movable or actuable to effect a tripping operation of the breaker 30, a first latching member 220 for maintaining or latching the movable member 210 in a predetermined position against the force of the biasing spring 212 when the contacts of the breaker 30 are closed, a second latch 272 for maintaining or holding the first latch 220 in a predetermined position when the contacts of the breaker 30 are closed, a movable or rotatable member 254 on which the second latch 272 is movably disposed for movement with the member 254 when the contacts of the breaker 30 are closed, and an electromagnet 240 which is responsive to the current in the contacts of the associated pole unit of the breaker 30 to actuate movement of the member 254 and the release of the latches 272 and 220 to thereby actuate the movement of the movable member 210 to effect tripping of the breaker 30 when the magnitude of the current in the contacts of the associated pole unit of the breaker 30 reaches or increases to a predetermined value. The time delay device 310 is provided to restrain the movement of the member 254 for a predetermined time delay after the electromagnet 240 would otherwise actuate the movement of the member 254 to effect a tripping operation of the breaker 30.

More specifically, the movable member 210 is similar to the movable member 110 of the tripping device 32 and is slidably supported on a stationary supporting member or frame 234 which is preferably formed from a nonmagnetic material such as aluminum with the right end of the movable member 210 disposed adjacent to the rocker arm 52 on the common trip bar 62 of the breaker 30 in the position shown in FIG. 10 when the contacts of the breaker 30 are closed. A guide member 219 is provided to guide the rectilinear or sliding movement of the movable member 210 and is secured to the top of the frame 234 by any suitable means, such as the bolts indicated in FIG. 10. In order to bias the movable member 210 toward the right as viewed in FIGS. 10 and 11, the biasing spring 212 is connected between a stationary post 215 which is supported by the frame 234 and an upwardly extending portion 214 of the movable member 210, which is generally L-shaped in configuration. The movable member 210 also includes a recess or slot 217 at one side thereof to receive a portion of the first latch 220. The movable member 210 is normally maintained in the position shown in FIG. 10 when the contacts of the breaker 30 are closed by the portion 224 of the first latch 220 which projects into the recess 217 to prevent movement of the movable member 210 toward the right under the influence of the biasing spring 212. It is to be noted that the guide member 219 also includes an opening at one side thereof to permit the first latch 220 to pass therethrough and engage the recess 217 of the movable member 210.

The first latch 220 is generally sector-shaped in configuration and is rotatably supported at its apex portion by the fixed pivot pin 204 which in turn is supported by the frame 234 to permit rotation of the first latch 220 in a plane which is substantially parallel to the plane of the frame 234. As previously mentioned, the first latch 220 includes a shoulder portion 224 which is disposed to engage one side of the recess 217 of the movable member 210 to restrain or prevent movement of the movable member 210 toward the right under the influence of the biasing spring 212. In order to actuate or bias the first latch 220 in a counterclockwise direction about the pivot pin 204, as viewed in FIG. 10, during certain operating conditions, a biasing spring 222 is connected between an upwardly extending portion provided on top of the first latch 220, as indicated at 226, and a stationary spring post 202 which in turn is supported on top of the guide member 219. It is also to be noted that the biasing spring 212 exerts a biasing force on the first latch 220 through the movable member 210 since the movable member 210 tends to push the shoulder portion 224 of the first latch 220 in a clockwise direction about the pivot pin 204, as viewed in FIG. 10.

In order to maintain the first latch 220 in a predetermined position, as shown in FIG. 10, when the contacts of the breaker 30 are closed, the second latch 272 which is generally U-shaped in configuration is provided. In general, the second latch 272 is movably disposed on the member 254 for rotation or movement therewith when the contacts of the breaker 30 are closed with the left leg portion 267 of the second latch 272 normally bearing against one side of the sector-shaped first latch 220 to prevent or restrain the first latch 220 from rotating in a clockwise direction about the pivot pin 204 under the influence of the biasing spring 212 which exerts a relatively greater biasing force on the first latch 220 through the movable member 210 than the biasing spring 22. It is also to be noted that the biasing spring 212 exerts a biasing force on the left leg portion 267 of the second latch 272 which is transmitted through the movable member 210 and the first latch 220 and which tends to push the left leg portion 267 of the second latch 272 toward the left as viewed in FIG. 10, when the contacts of the breaker 30 are closed.

The movable member 254 which is generally L-shaped in configuration is rotatably supported on the frame 234 by the fixed pivot pin 256 which passes through the portions of the member 254 which extend laterally from the shorter leg portion of the member 254 toward the frame 234, as best shown in FIG. 10. The longer leg portion of the member 254 includes a longitudinally extending generally rectangular opening 263 through which the right leg portion of the second latch 272 passes to permit sliding movement of the second latch 272 with respect to the member 254 under certain operating conditions of the tripping device 200. It is to be noted the right leg portion of the second latch 272 includes notches or recesses at the opposite side thereof to receive the sides of the opening 263 of the movable member 254 to capture and guide the latch 272 for sliding movement with respect to the member 254. The opening 263 in the member 254 also includes the stop members 269 which extend into the path of sliding movement of the latch 272 to limit movement of the latch 272 toward the right under the influence of a biasing tension spring 264 which is connected between the bottom of the right leg portion of the second latch 272 and a spring post 269 provided at the right end of the opening 263 in the member 254. In order to insure that the second latch 272 rotates or moves with the movable member 254 when the contacts of the breaker 30 are closed, an opening or slot provided in the second latch 272 as indicated at 275 adjacent to the left leg portion 267 of the second latch 272 to receive a projecting portion 273 of the movable member 254 which extends into the slot or opening 275 and bears against the yoke or top portion of the second latch 272 when the second latch 272 is in the position shown in FIG. 10 of the drawings. The movable member 254 also includes a slot or recess 258 to receive the stem or shaft 322 of the time delay device 310 when a device of the latter type is employed, as will be explained hereinafter to restrain clockwise rotation of the movable member 254 about the pivot pin 256. In order to bias the movable member 254 in a clockwise direction about the pivot pin 256 during certain operating conditions of the tripping device 200, a biasing spring 266 is connected between an upwardly extending portion 257 at one side of the longer portion of the movable member 254 and an upwardly extending portion 255 of the armature or movable member 252 of the tripping electromagnet 240.

Figures 12, 19:
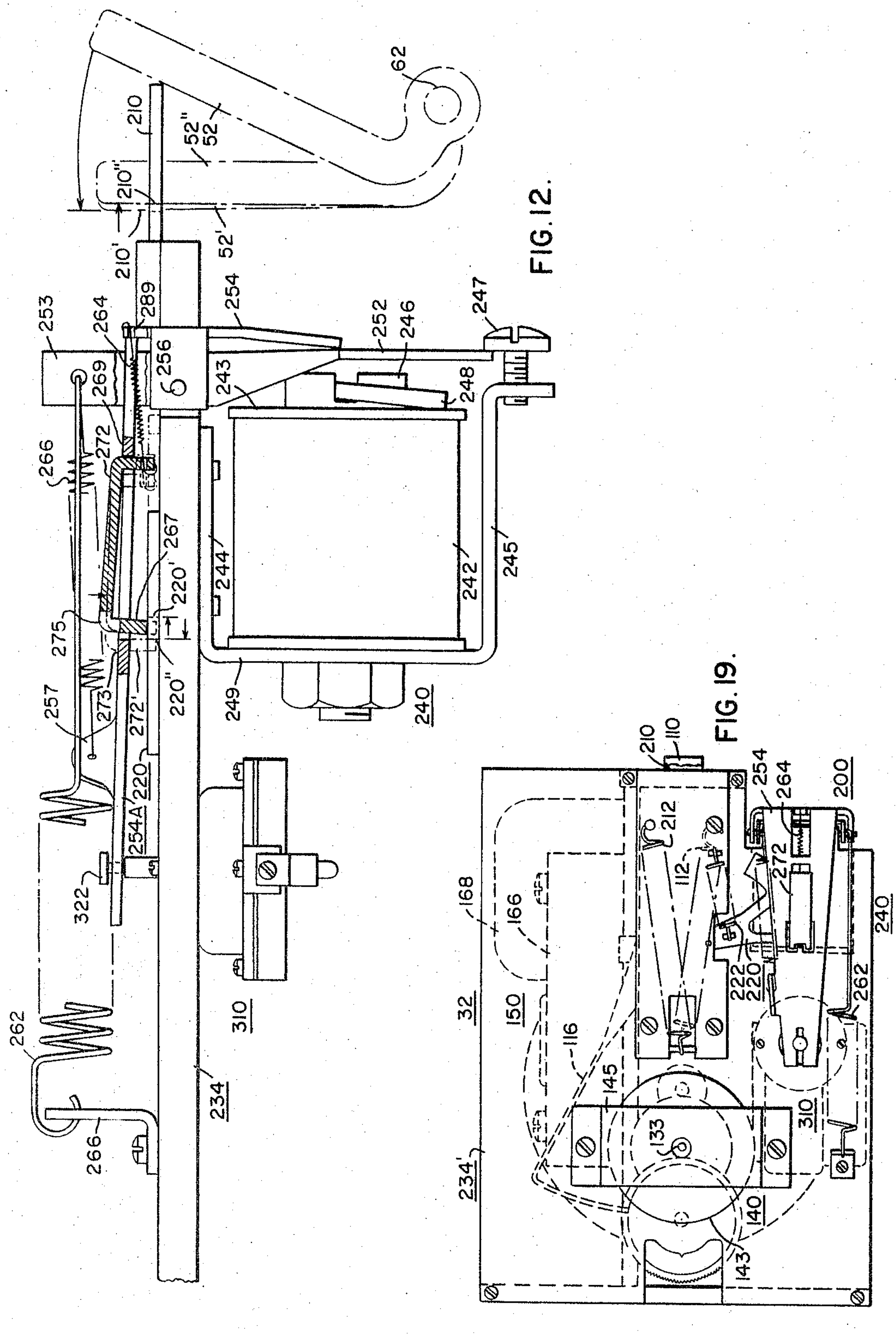
FIG. 12 is an elevational view, partly in section, of the instantaneous tripping means shown in FIGS. 10 and 11.
FIG. 19 is a top plan view of a tripping means including both the time delay tripping means shown in FIG. 1 and the instantaneous tripping means shown in FIG. 10.

As best shown in FIGS. 10 and 12, the tripping electromagnet 240 comprises a stationary magnetic structure which is generally E-shaped in configuration including the upper and lower leg portions 244 and 245, respectively, the middle leg portion 242 and the yoke or bight portion 249. The stationary magnet structure of the electromagnet 240 is supported by and secured to the frame 234 by any suitable means, such as bolts or screws. The electromagnet 240 also includes a movable magnetic member or armature 252 which is rotatably supported by the same pivot pins 256 as the movable member or follower member 254 and includes the first and second upwardly extending portions 253 and 255, respectively, at the opposite sides thereof. Both the stationary magnetic structure of the electromagnet 240 and the armature 252 are formed from any suitable soft magnetic material with a magnetic path extending from the upper leg portion 244 through a slight magnetic gap into the armature 252. The armature 252 is normally biased away from the stationary magnetic structure of the electromagnet 240 with a predetermined air gap between the middle leg portion 246 and the armature 252 and with a predetermined air gap between the lower leg portion 245 and the armature 252 by a biasing spring 262 which is connected between the upwardly extending portion 253 of the armature 252 and a spring post 266 which is supported on and secured to the frame 234 at the other end of the spring 262. In order to adjust the predetermined air gap between the armature 252 and the different portions of the stationary magnetic structure of the electromagnet 240, the adjustable stop member or bolt 247 which may be formed of a suitable non-magnetic material, such as brass or aluminum, is mounted or disposed on a downwardly extending portion of the leg portion 245 of the stationary magnetic structure to limit the counterclockwise rotation of the armature 252 under the influence of the biasing force applied to said armature by the biasing spring 262.

The electromagnet 240 also includes an energizing winding or coil 242 which may be connected to cross the output of a current transformer which is inductively disposed in inductive relation with one of the line conductors L1, L2 and L3 of the breaker 30, similarly to the current transformers CT1, CT2 and CT3 to be responsive to the current which flows in the contacts C1, C2 or C3, of the pole units of the breaker 30. The winding 242 is disposed on an insulating spool or bobbin 243 which in turn is mounted or disposed on the middle leg portion 246 of the stationary magnet structure of the electromagnet 240. A shading coil 248 may be disposed to surround a portion of the stationary magnetic structure, which is illustrated as a portion of the middle leg portion 246 of the stationary magnetic structure to prevent chattering of the armature 252 under certain operating conditions of the tripping device 200. It is to be noted that the lower portion of the movable portion 254 is disposed to bear against and follow the movement of the armature 252 under the influence of the biasing spring 266 whenever the armature 252 rotates in a clockwise direction about the pivot pin 256 under the influence of the magnetomotive force which is established when current flows through the energizing winding of the electromagnet 240.

Figure 13:
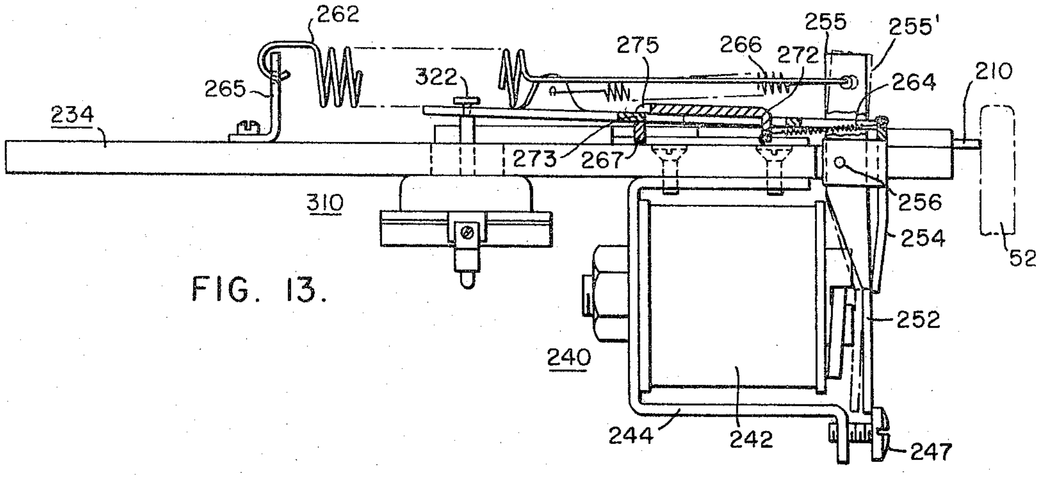
FIGS. 13 and 14 are elevational views, partly in section, of the tripping means shown in FIGS. 10–12, illustrating different operating conditions of the tripping means.
Figure 14:
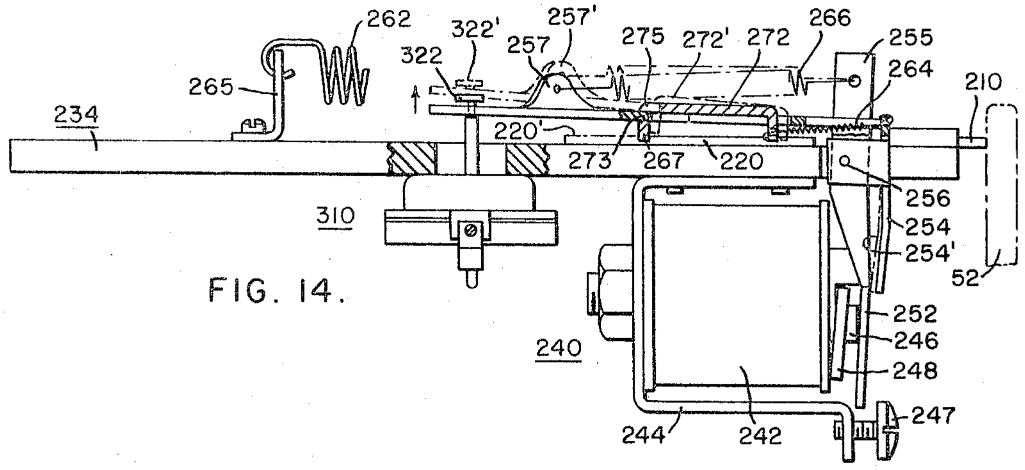
Figure 15:
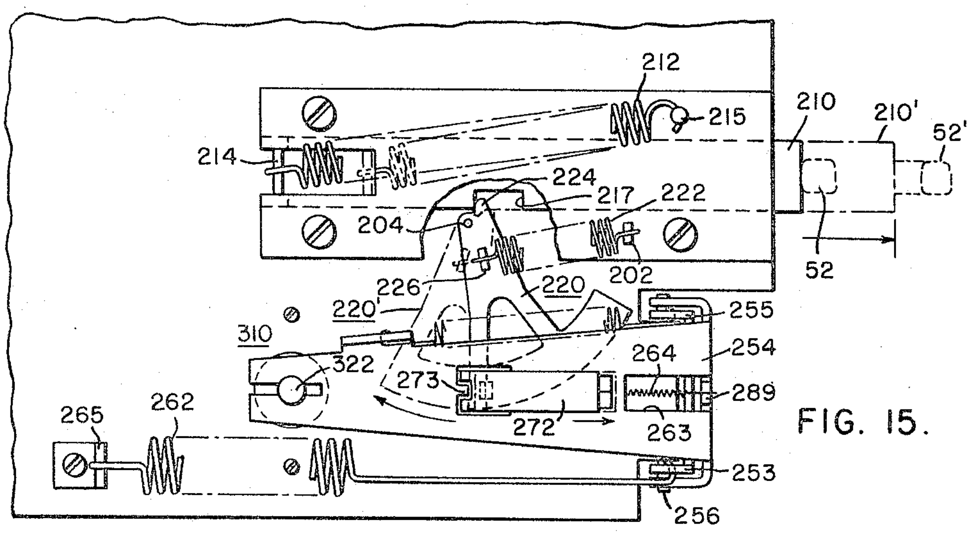
FIG. 15 is a top plan view of the tripping means shown in FIG. 10 with certain portions cut away to illustrate the operating condition of the tripping means when the associated circuit breaker is in the closed circuit condition.
Figure 16:
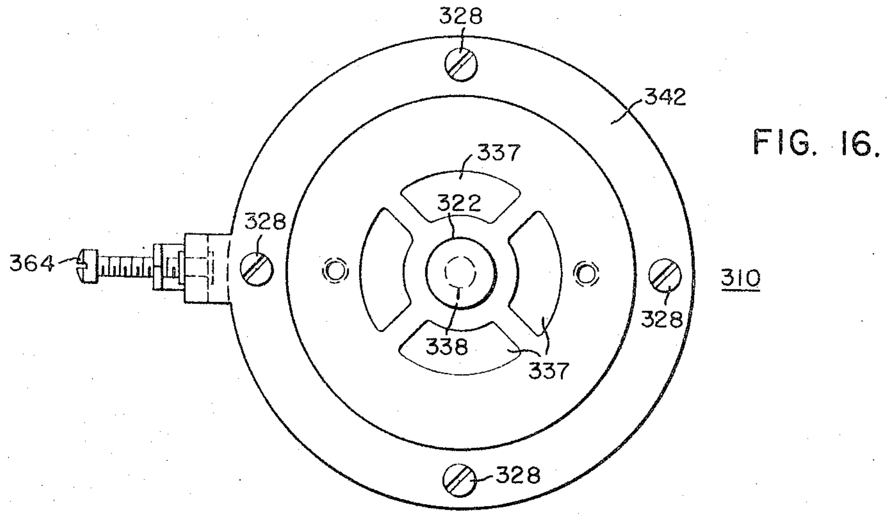
FIG. 16 is a top plan view of a time delay device which may be employed with the instantaneous tripping means shown in FIGS. 10–15.
Figure 17:
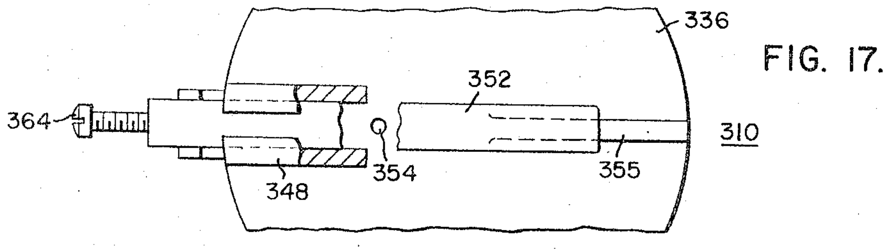
FIG. 17 is a plan view of a portion of the time delay device shown in FIG. 16 illustrating the construction of the underside of the device shown in FIG. 16.

The operation of the tripping device 200 will now be described in the absence of the time delay device 310 assuming that the tripping device 200 is substituted for each of the tripping devices 31, 32 and 33 of the breaker 30 shown in FIG. 1. As long as the current in the contacts of the associated pole unit of the breaker 30 remains below the predetermined value of current necessary to actuate the armature 252 of the electromagnet 240 of the tripping device 200 toward the stationary magnetic structure of the electromagnet 240, the movable member 210 of the tripping device 200 will remain in a latched condition as shown in FIG. 10 and FIG. 13 and the operating mechanism 40 of the breaker 30 will remain in a latched condition with the contacts C1, C2 and C3 in a closed circuit condition. In the normal operating condition of the tripping device 200, when the contacts of the breaker 30 are closed, the armature 252 of the electromagnet 240 is biased in a counterclockwise direction against the stop member 247 by the bias spring 262. The force exerted by the biasing spring 266 tends to rotate the follower member 254 in a clockwise direction about the pivot pin 256 against the armature 252. The second latch 272 will therefore be in the position shown in FIG. 10 to prevent the first latch 220 from rotating in a clockwise direction about the pivot pin 204 under the influence of the biasing spring 212 which transmits a biasing force to the first latch 220 through the movable member 210. In addition, the first latch 220 will exert a biasing force pushing the second latch 272 to the left as viewed in FIG. 10 to insure that the second latch 272 will move or rotate with the follower member 254 of the tripping device 200.

When a predetermined overload current flows in the contact of the associated pole unit of the breaker 30, the armature 252 of the electromagnet 240 of the tripping device 200 will be drawn or attracted toward the stationary magnetic structure of the electromagnet 240 and rotate in a clockwise direction about the pivot pin 256. The follower member 254 will then be permitted to also rotate in a clockwise direction about the pivot pin 256 to follow the movement of the armature 252 under the influence of the biasing spring 266. It is to be noted that in order for the armature 252 to be drawn towards the stationary magnetic structure of the electromagnet 240, the force exerted on the armature 252 must exceed the biasing force exerted on the armature 252 by the biasing spring 262. When the follower member 254 follows the clockwise movement of the armature 252 in response to a predetermined overload current in the contacts of the associated pole units of the tripping device 200, the second latch 272 also rotates with the follower member 254 until the left leg portion of the second latch as indicated at 267 in FIG. 12 is rotated in a clockwise direction about the pivot pin 256 to clear the first latch 220 and release the first latch 220 for clockwise rotation about the pivot pin 204 under the influence of the biasing force exerted by the spring 212 as transmitted through the movable member 210. When the first latch 220 rotates in a clockwise direction, as viewed in FIGS. 10 and 11, and the shorter portion 224 of the first latch 220 rotates out of the recess 217 of the movable member 210, the movable member 210 is released and moves to the right under the influence of the biasing spring 212 to actuate the rocker arm 52 to effect a tripping operation of the breaker 30 and open the contacts C1, C2 and C3 to thereby interrupt the energizing current through the winding 242 of the electromagnet 240. It is to be noted that when the armature 252 of the electromagnet 240 is actuated, the tripping of the breaker 30 occurs substantially instantaneously since there is no relatively long time delay provided in the tripping device 200 of the type described in connection with the tripping device 32, previously described. The operation of the tripping device 200 just described does not include the effect of the optional time delay device 310 which will be described hereinafter.

Figure 1D:
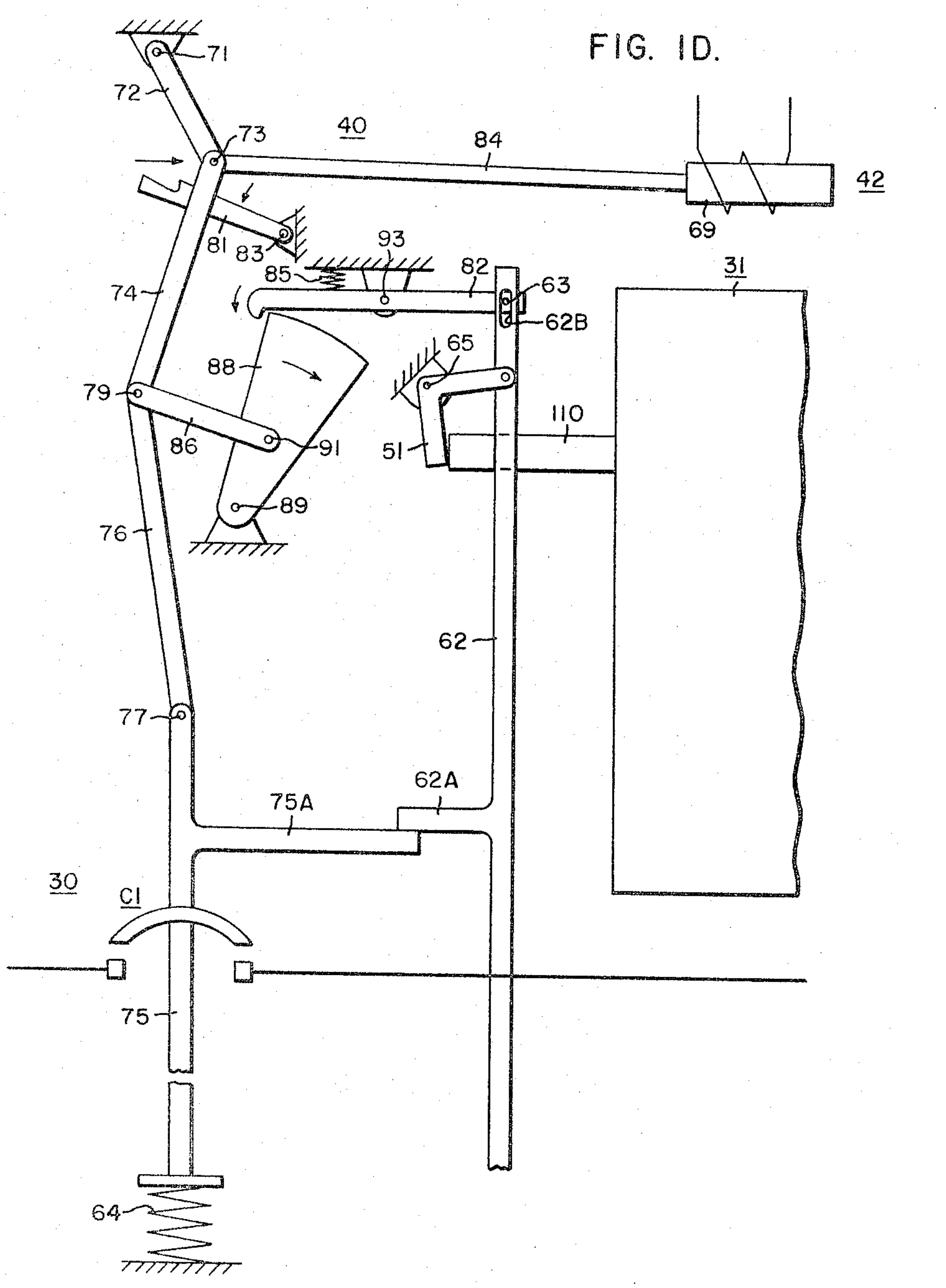

Following a tripping operation of the tripping device 200, as just described, in the absence of a time delay device 310, the operating mechanism 40 of the breaker 30 automatically resets the main latch 88 and the latch lever 82 of the operating mechanism 40 to thereby return the common trip bar 62 of the operating mechanism 40 to the position, as shown in FIG. 1D, and as previously described in connection with the operation of the tripping devices 31, 32 and 33, and rotates the rocker arms associated with each of the tripping units 200 from the position, indicated at 52 in FIG. 12, to the position indicated at 52′ in FIG. 12, to thereby actuate the movable member 210 toward the left, as viewed in FIGS. 10 and 12, against the biasing force of the spring 212 to the position indicated at 210′ in FIG. 12 to thereby reset the first latch 220, to the position indicated at 220′ in FIGS. 11 and 12. It is to be noted first that when the breaker 30 is tripped by the operation of the tripping device 200 as just described, and the first latch 220 rotates in a clockwise direction about the pivot pin 204 to the position indicated at 220 in FIG. 12 underneath the second latch 272, the biasing force exerted on the second latch 272 by the biasing spring 212 through the movable member 210 and the first latch 220 is no longer present and the second latch 272 moves to the right, as viewed in FIG. 12, under the influence of the bias spring 264 until the second latch 272 bears against the stop members 269 provided on the follower member 254 which limit movement of the second latch 272 toward the right. Due to the relative dimensions of the second latch 272 and the follower member 254 and the opening 263 in said follower member, the second latch 272 also rotates slightly in a clockwise direction with respect to the follower member 254 about the stop members 269 as a pivot point, to thereby reduce the frictional force of the second latch 272 bearing on the top of the first latch 220, as viewed in FIG. 12. When the second latch 272 moves to the right, the projection 273 on the follower member 254 no longer engages the opening 275 of the second latch 272 which is permitted to move independently, in certain respects, relative to the follower member 254. It is to be noted that since the second latch 272 is constructed as a structural member which is separate from the follower member 254, when the breaker 30 is tripped, the force exerted by the biasing spring 262 on the second latch 272 is substantially reduced or eliminated to thereby reduce or substantially eliminate the frictional force that would be present between the second latch 272 and the first latch 220 due to the force that would be otherwise transmitted from the biasing spring 262 through the armature 252 and the follower member 254 if the second latch 272 were formed integrally with the follower member 254. It is also to be noted that when the breaker 30 is tripped and the contacts are opened, the force exerted on the armature 252 by the electromagnet 240 is eliminated when the current flow is interrupted and the biasing spring 262 returns the armature 252 to the position shown in FIG. 12 to thereby actuate the follower member 254 in a counterclockwise direction about the pivot pin 256 to the position shown in FIG. 12.

Figure 11:
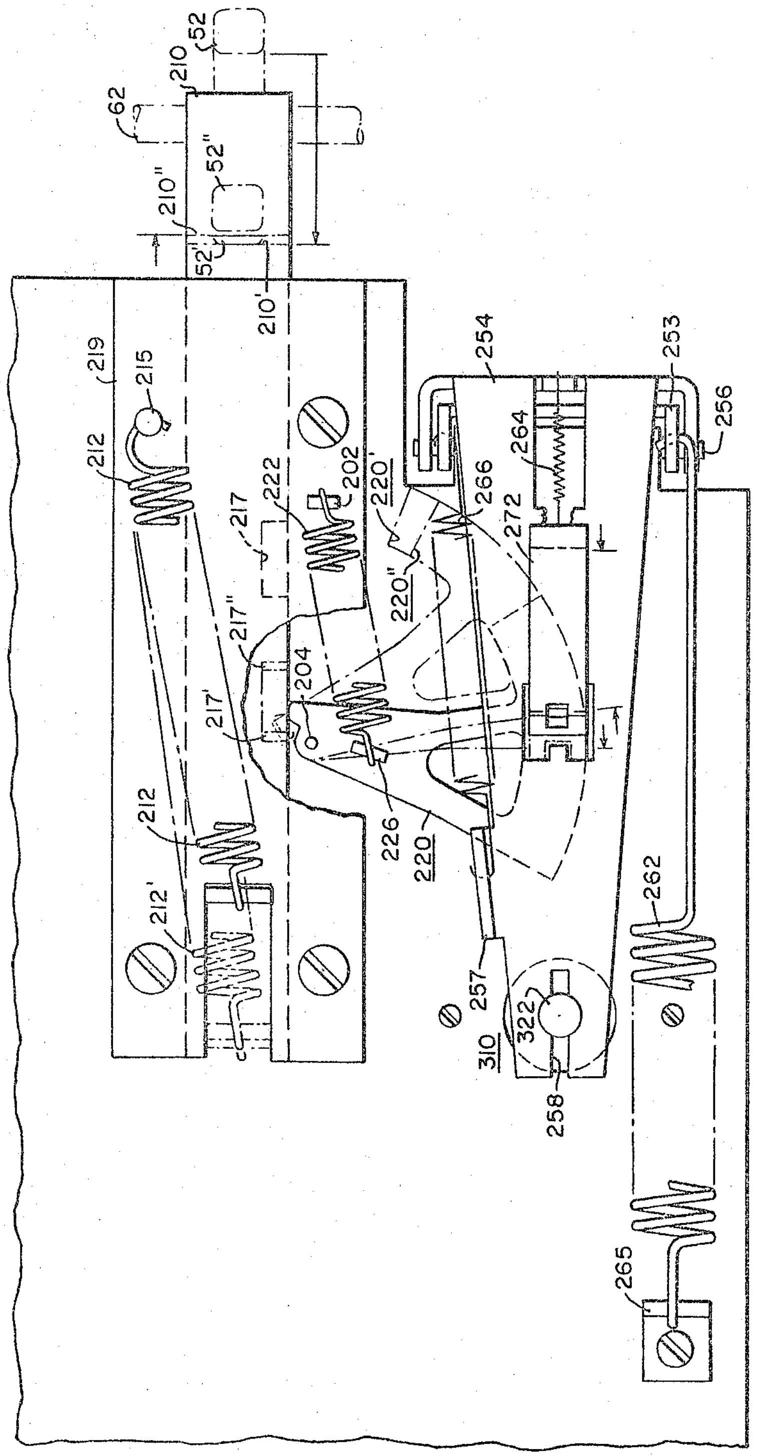
FIG. 11 is a top plan view of the instantaneous tripping means shown in FIG. 10 with certain portions cut away to illustrate the operating condition means when the associated circuit breaker is in the tripped condition.

When the movable member 210 is actuated toward the left by the resetting movement of the rocker arm 52 after the breaker 30 has been tripped, the first latch 220 is rotated in a counterclockwise direction from the position shown in FIG. 11, in which the movable member 210 acts as a stop to prevent such counterclockwise rotation, until the recess 217 of the movable member 210 moves to the position indicated in phantom at 217′ in FIG. 11 to thereby permit counterclockwise rotation of the first latch 220 about the fixed pivot 204 to the position indicated in phantom at 220′ in FIG. 11 under the influence of the biasing spring 222. When the contacts of the breaker 30 are closed by the closing solenoid 42 and the rod 75 moves downwardly to the position shown in FIG. 1, the force exerted on the common trip bar 62 by the rod 75 through the projecting portions 75A and 62A will no longer be applied and the biasing spring 212 will then actuate the movable member 210 to move slightly to the right to the position indicated in phantom at 210′ thereby actuating the first latch 220 in a clockwise direction to the latched position indicated in phantom at 220′ in FIG. 11. During the resetting movement of the first latch 220 as just described, the first latch 220 moves from the position indicated in FIG. 12 at 220 to the position indicated in phantom at 220′ in FIG. 12 to the right of the left leg portion 267 of the second latch 272 which then rotates in a counterclockwise direction about the pivot point associated with the stop members 269 to engage the first latch 220. When the first latch 220 then moves in a clockwise direction, as viewed in FIG. 11, about the pivot pin 204 to the position indicated in phantom at 220′, the second latch 272 is then slidably moved under the influence of the biasing force which is transmitted from the biasing spring 212 through the movable member 210 and the first latch 220 to the left until the projecting portion 273 of the follower member 254 again engages the opening 275 and the yoke or top portion of the second latch 272, as indicated in phantom at 272′ in FIG. 12 which indicates the position of the second latch 272 when the contacts of the breaker 30 are closed. It is to be noted that the downward movement of the second latch 272 during the resetting operation occurs under the influence of the biasing force provided by the spring 264. The tripping device 200 is thus restored to its normal operating position when the breaker 30 is reclosed by the closing solenoid 42, as previously described.

In order to provide a predetermined time delay in the operation of the tripping device 200 which is relatively short compared to the time delay provided in the tripping device 32 previously described, the time delay device 310 may be added to the tripping device 200 in certain applications to restrain the movement of the follower member 254 in following the movement of the armature 252 of the electromagnet 240 for a predetermined time delay. The time delay device 310 and certain features thereof is disclosed and claimed in copending application Serial No. 380,520 filed concurrently by William H. South and assigned to the same assignee as the present application which issued April 26, 1966, as U.S. Patent 3,247,932. In general, the stem or shaft 338 of the time delay device 310 which includes a flanged portion 322 is operatively connected or coupled to the left end of the follower member 254 at the slot 258 to restrain or retard the movement of the follower member 254 in a clockwise direction about the pivot pin 256 to follow the movement of the armature 252 under the influence of the biasing spring 266, when the armature 252 is actuated toward the stationary magnetic structure of the electromagnet 240 in response to a predetermined overload current flowing in the contacts of the associated pole unit of the breaker 30 for a predetermined time delay.

Figure 18:
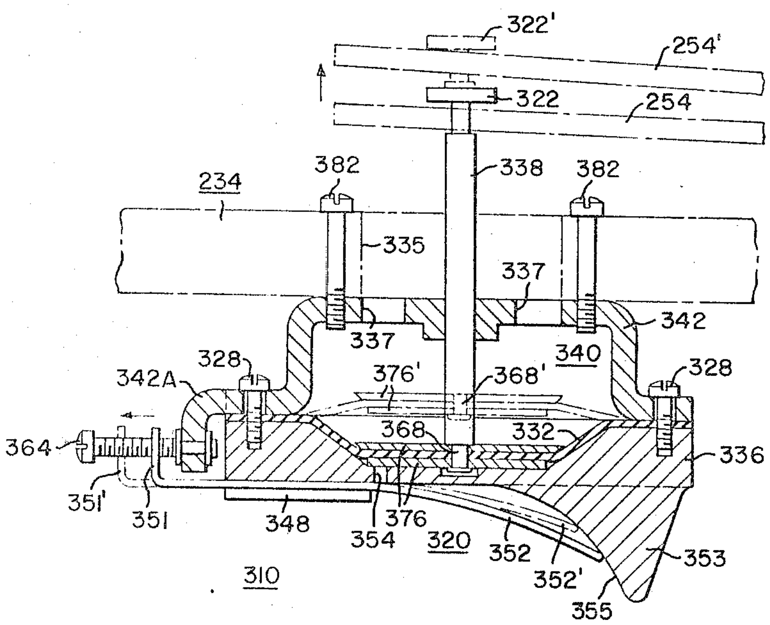
FIG. 18 is a side elevational view, partly in section, of the time delay device shown in FIGS. 16 and 17.

More specifically, the time delay device 310 comprises a flexible diaphragm 332, as shown in FIG. 18, which is attached to the lower end of the stem or shaft 338, and a valve means 320 for admitting air or other fluid to the space below the diaphragm 332 at various rates to provide different durations of time delay in the operation of the follower member 254 and in the overall operation of the tripping device 200. The flexible diaphragm 332 is disposed in a chamber 340 formed in an upper housing member 342 and a lower housing member 336. Both of said housing members may be formed of molded or cast material. The outer edge of the diaphragm 332 is clamped between housing members 342 and 336 which may be secured together by suitable means, such as the bolts 328, along with a sealing gasket (not shown) to thereby form an air-tight seal. The time delay device 310 is rigidly secured to the underside of the frame 234 by any suitable means, such as the bolts 282, and an opening is provided in the frame 234 through which the stem 338 passes, said opening or hole having a relatively larger diameter than the stem 338, as indicated at 335. The upper housing member 342 includes an opening through which the stem 338 freely passes and a plurality of openings 337 which permit the application of atmospheric pressure to the top of the diaphragm 332 through the opening 335 in the frame 234. The central portion of the diaphragm 332 is clamped between the upper and lower clamp members 376 with both of said clamp members and the central portion of the diaphragm 332 being secured to the lower end of the stem 338 by suitable means, such as the rivet 368, to form an air-tight seal. Since the spaces or portions of the chamber 340 above and below the diaphragm 332 are completely sealed off from each other and the space above the diaphragm 332 is at atmospheric pressure, any force tending to raise the stem 338 will be restrained by the partial vacuum below the diaphragm.

In order to control the rate of movement of a follower member 254 attempting to follow the movement of the armature 252 when a predetermined overload current flows in the contacts of the associated pole unit of the breaker 30, the valve means or device 320 is provided to admit air or other fluid to the space below the diaphragm 332 at different rates to provide different lengths or durations of time delay in the operation of the follower member 254 and in the operation of the overall tripping device 200. The valve device 320 includes a relatively small opening 354 which passes through the central portion of the lower housing member 336 and a flat strip member or reed member which is formed from a relatively thin metal or other strip material having a certain degree of resilience or stiffness and which is disposed to pass over the opening 354 in the lower housing member 336. The portion of the strip or reed member 352 to the left of the opening 354 as viewed in FIG. 18 is slidably supported to bear against the bottom of the lower housing member 346 by the guide means 348 which may be secured to or formed integrally with the lower housing member 336. The left portion of the strip member 352 also includes an upwardly extending portion 351 which is threadedly engaged by an adjusting or calibrating screw 364 which in turn is rotatably supported by a depending portion 342A of the upper housing member 342. The portion of the strip member 352 to the right of the opening 354 is disposed to bear against a generally wedge-shaped member 353 which includes a cam or sloping surface 355 and which is secured to or formed integrally with the lower housing member 336.

In the operation of the time delay device 310, when the strip member 352 is in the position indicated in phantom at 352′, the strip member 352 substantially closes off the opening 354 and substantially prevents the entrance of any air or other fluid into the space below the diaphragm 332. When the strip member 352 which is relatively movable with respect of the wedge-shaped member 353 is moved to the right as indicated at 352 in FIG. 18, a relatively thin wedge-shaped passageway is defined between the strip member 352 and the bottom of the lower housing member 336 to permit air or other fluid to enter the space below the diaphragm 332 at a predetermined rate. The size or volume of the wedge-shaped passageway which is defined between the lower housing member 336 and the strip member 332 may be varied for different rates of air flow into the space beneath the diaphragm 332 by varying the position of the strip member 352 with respect to the cam surface 355 of the wedge-shaped member 353. It is to be understood that in certain applications, the strip member 352 may be held in a stationary position and the wedge-shaped member 353 formed as a separate part which is adjustably movable with respect to the stationary strip member. It is to be noted that the size of the opening defined between the strip member 352 and the lower housing member 336 is determined both by the position of the right end of the strip member 352, as just described, and also by the thickness and modulus of elasticity of the material from which the strip member 352 is formed.

The operation of the overall tripping device 200 including the effect of the time delay device 310 where applied will now be described. When a predetermined overload current occurs in the contacts of the pole unit associated with the tripping device 200 and the armature 252 is actuated from the position shown in FIG. 13 to the position shown in FIG. 14 to engage the stationary magnetic structure of the electromagnet 200, the follower member 254 is not permitted to immediately follow the movement of the armature 252, since the left end of said follower member is restrained by the force exerted on said follower member by the time delay device 310. The time delay device 310 will exert a biasing force on the left end of the follower member 254 which is downward in direction or in a counterclockwise direction about the pivot pin 256, while the biasing spring 266 will exert an opposing biasing force on the follower member 254 which is clockwise in direction about the pivot pin 256. As the air or other fluid enters the space below the diaphragm 332, the biasing spring 266 will gradually overcome the force exerted on the follower member 254 by the time delay device 310 and permit clockwise movement of the follower 254 to follow the armature 252 to the position indicated in phantom at 254′ in FIG. 14 after a predetermined time delay which depends upon the setting of the strip member 352 of the time delay device 310. If the overload current which causes the actuation of the armature 252 to the position shown in FIG. 14 persists for a time longer than the predetermined time delay which is provided by the time delay device 310, the follower member 254 will reach the position indicated at 254' in FIG. 14 and the second latch 272 will be actuated by the follower member 254 to release the first latch 220 and to effect the tripping operation of the breaker 30, as previously described. If the predetermined overload current which actuates the armature 252 does not continue as long as the predetermined time delay which is provided in the operation of the tripping device 200 by the time delay device 310, the armature 252 will be reset from the position shown in FIG. 14 to the normal position shown in FIG. 13 to thereby actuate the follower member 254 in a counterclockwise direction about the pivot pin 256 to thereby reset the time delay device 310 to its normal or operating condition shown in FIG. 18 since the follower member 254 will push the stem or shaft 338 in a downward direction, as viewed in FIG. 18. Since the second latch 272 moves with the follower member 254 as long as the contacts of the breaker 30 are closed due to the engagement of the opening 275 in the second latch 272 by the projecting portion 273 of the follower member 254, the second latch 272 will also move downwardly with the resetting with the follower member 254, as just described, when an overload current occurs which actuates the armature 252 of the electromagnet 240 and continues for a time less than the predetermined time delay which is provided in the operation of the tripping device 200 by the time delay device 310 to thereby prevent the second latch 272 from gradually moving up in steps or riding up on the first latch 220 when a series of overload current conditions occur, each of which continues for less than a predetermined time delay provided by the time delay device 310. If the second latch 272 were permitted to move up in stages or steps as just indicated independently of the follower member 254, the time delay that would result on the final overcurrent condition in a series of overcurrent conditions, each of which continues less than the predetermined time delay of the time delay device 310, could result in a shorter final time delay than that normally provided by the time delay device 310 in the operation of the tripping device 200.

The construction of the tripping device 200 has several advantages; for example, forming the second latch 272 as a member which is separate from and mounted on the follower member 254 and which moves with the follower member 254 when the contacts of the breaker 30 are closed, permits a tripping operation of the breaker 30 to be effected in response to the operation of the electromagnet 240, as previously described, while reducing the frictional force between the second latch 272 and the first latch 220 after a tripping operation has occurred to thereby reduce the energy or force required to rest the tripping device 200 by the operating mechanism 40 of the breaker 30. In addition, the manner in which the second latch 272 cooperates with the follower member 254 to move therewith as long as the contacts of the breaker 30 are closed, prevents the second latch 272 from moving independently with respect to the follower member 254 when a series of overload currents occur each of which continues less than the predetermined time delay of the time delay device 310 to prevent a shorter time delay in the operation of the tripping device 200 than that normally provided by the time delay device 310, where applied.

Referring now to FIG. 19, there is illustrated a combined tripping means which include both the tripping device or means 32 and the tripping device or means 200 in a combined structure in which the movable members 110 and 210 are disposed to move substantially parallel to one another to actuate a common movable member, such as the rocker arm 52 which is disposed on the common trip bar 62 of the breaker 30. In the combined tripping means shown in FIG. 19, the tripping device 32 may be employed for a certain predetermined range of overload currents up to a predetermined maximum value to provide a relatively long time delay which varies with the square of the magnitude of the overload current in a predetermined range of currents and the tripping device 200 could be provided with or without the time delay means 310 to trip or effect tripping of the breaker 30 for predetermined overload currents above the maximum predetermined value of overload current previously mention substantially instantaneously or with a relatively short time delay as determined by the time delay device 310, where applied.

It is to be understood that the driving means 150 of the tripping means 32 may be responsive to an electrical quantity, such as overcurrent or a zero sequence current signal, which is different from the electrical quantity to which the electromagnetic means 140 is responsive in a particular application or that both the driving means 150 and the electromagnetic means 140 may be responsive to the same electrical quantity of a particular type. It is also to be understood that the electromagnetic means 140 may be of a conventional attractive type rather than of the particular type disclosed.

It is to be further understood that other types of timing drive motors may be substituted for the induction device 150 which is adapted to alternating current applications, such as a series direct current motor, in direct current applications.

Since numerous changes may be made in the above-described apparatus and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. A circuit breaker comprising relatively movable contacts, operating means for opening said contacts, a movable member movable to actuate said operating means to effect automatic opening of said contacts, driving means responsive to an applied electrical quantity for providing an output having a speed which varies with the magnitude of the applied electrical quantity, driven means actuable by said driving means when coupled thereto to move said movable member after a predetermined time delay which varies with the speed of said driving means, and means for coupling the output of said driving means to said driven means only when the magnitude of the applied electrical quantity reaches a predetermined value to start said predetermined time delay.

2. A circuit breaker comprising relatively movable contacts, operating means for opening said contacts a movable member movable to actuate said operating means to effect automatic opening of said contacts, driving means responsive to an applied electrical quantity for providing an output having a speed which varies with the magnitude of the applied electrical quantity, driven means actuable by said driving means when operatively connected thereto to move said movable member after a predetermined time delay which varies with the speed of said driving means, and means responsive to the applied electrical quantity for operatively connecting the output of said driving means tc said driven means only when the magnitude of the applied electrical quantity reaches a predetermined value to start said predetermined time delay.

3. A circuit breaker comprising relatively movable contacts, operating means for opening said contacts, a movable member movable to actuate said actuating means to effect automatic opening of said contacts, an induction device responsive to an applied electrical quantity for providing an output torque having a speed which varies with the magnitude of the electrical quantity, driven means actuable by the output torque of said induction device to effect the movement of said movable member after a predetermined time delay which varies with the speed of said output torque, means actuable to mechanically couple the output torque of said induction device to said driven means, and electromagnetic means responsive to the same electrical quantity for actuating the last-mentioned means to couple the output torque of said induction device to said driven means when the magnitude of the electrical quantity reaches a predetermined value.

4. A circuit breaker comprising relatively movable contacts, operating means for opening said contacts, a movable member movable to actuate said operating means to effect automatic opening of said contacts, an induction device responsive to an applied electrical quantity for providing an output torque having a speed which varies with the magnitude of the electrical quantity, driven means actuable by the output torque of said induction device to effect the movement of said movable member after a predetermined time delay which varies with the speed of said output torque, means actuable to mechanically couple the output torque of said induction device to said driven means and electromagnetic means responsive to an electrical quantity for actuating the last-mentioned means to couple the output torque of said induction device to said driven means when the magnitude of the last-mentioned electrical quantity reaches a predetermined value, said electromagnetic means comprising an energizing winding and a pair of relatively movable, concentrically disposed members which are electromagnetizable to have like magnetic poles at adjacent ends of the respective members when said winding is energized.

5. A circuit breaker comprising relatively movable contacts, operating means for opening said contacts, a movable member movable to actuate said operating means to effect automatic opening of said contacts, an induction device responsive to an applied electrical quantity for providing a drive having a speed which varies with the value of the electrical quantity, driven means actuable by the drive of said induction device to effect movement of said movable member after a predetermined time delay which varies with the speed of said drive, means for establishing a drive from said induction device to said driven means, and means responsive to said electrical quantity for actuating said drive establishing means to establish a drive from said induction device to said driven means when said electrical quantity reaches a predetermined value to thereby initiate the start of said predetermined time delay.

6. A circuit breaker comprising relatively movable contacts, operating means for opening said contacts, a movable member movable to actuate said operating means to effect automatic opening of said contacts, an induction device responsive to an applied electrical quantity for providing a drive having a speed which varies with the value of the electrical quantity driven means actuable by the drive of said induction device to effect movement of said movable member after a predetermined time delay which varies with the speed of said drive, means for establishing a drive from said induction device to said driven means, and means responsive to said electrical quantity for actuating said drive establishing means to establish a drive from said induction device to said driven means when said electrical quantity reaches a predetermined value to thereby initiate the start of said predetermined time delay, said drive establishing means comprising a plurality of normally spaced gears which are engageable when actuated by said last-mentioned means.

7. A circuit breaker comprising relatively movable contacts, operating means for opening said contacts, a movable member movable to actuate said operating means to effect automatic opening of said contacts, an induction device responsive to an applied electrical quantity for providing a drive having a speed which varies with the value of the electrical quantity, driven means actuable by the drive of said induction device to effect movement of said movable member after a predetermined time delay which varies with the speed of said drive, means for establishing a drive from said induction device to said driven means, and means responsive to said electrical quantity for actuating said drive establishing means to establish a drive from said induction device to said driven means when said electrical quantity reaches a predetermined value to thereby initiate the start of said predetermined time delay, said drive establishing means comprising a plurality of normally spaced gears which are engageable when actuated by said last-mentioned means, and means for compensating for misalignment of said gears prior to engagement thereof when said electrical quantity reaches said predetermined value.

8. A multi-pole circuit breaker comprising relatively movable contact means in each of the poles of said breaker, operating means for opening said movable contact means, a movable member common to all of the poles of said breaker movable to actuate said operating means to effect automatic opening of said contact means, an induction device in each pole of said breaker responsive to an applied current for providing an output torque at a speed which varies with the value of said current, driven means in each pole of said breaker actuable by the output torque of said induction device to effect the movement of said movable member after a predetermined time delay which varies with the speed of said output torque, means in each pole of said breaker actuable to mechanically couple said output torque of said induction device to said driven means and electromagnetic means in each pole of said breaker responsive to the same current for actuating the last-mentioned means to couple the output torque of said induction device to said driven means in the same pole when the value of said current reaches a predetermined value.

9. A multi-pole circuit breaker comprising relatively movable contact means in each of the poles of said breaker, operating means for opening said movable contact means, a movable member common to all of the poles of said breaker movable to actuate said operating means to effect automatic opening of said contact means, an induction device in each pole of said breaker responsive to an applied current for providing an output torque at a speed which varies with the value of said current, driven means in each pole of said breaker actuable by the output torque of said induction device to effect the movement of said movable member after a predetermined time delay which varies with the speed of said output torque, means in each pole of said breaker actuable to mechanically couple the output torque of said induction device to said driven means and electromagnetic means in each pole of said breaker responsive to the same current for actuating the last-mentioned means to couple the output of said induction device to said driven means in the same pole when the value of said current reaches a predetermined value, said means actuable to couple said output torque in each pole of said breaker comprising a plurality of said normally spaced gears relatively movable to engagement when actuated by said electromagnetic means.

10. A circuit breaker comprising relatively movable contacts, operating means for opening said contacts, a first movable member movable to actuate said operating means to effect automatic opening of said contacts, first latching means for releasably maintaining said movable member in a first position when said contacts are closed, second latching means for releasably engaging and maintaining said first latching means in a first position when said contacts are closed, a tripping electromagnet comprising an energizing winding and an armature operative when a predetermined electrical quantity is applied to said winding to move with respect to said winding, a second movable member having at least a portion disposed to follow the movement of said armature, said second latching means being movably supported on said second movable member to move therewith when said contacts are closed to release said first latching means when said predetermined electric quantity is applied to said winding to thereby effect opening of said contacts and means for actuating said second latching means when said first latching means is released to move independently of said second movable member to thereby reduce the energy required to return said first movable member to its first position after being moved therefrom.

11. A circuit breaker comprising relatively movable contacts, operating means for opening said contacts, a first movable member movable to actuate said operating means to effect automatic opening of said contacts, first latching means for releasably maintaining said movable member in a first position when said contacts are closed, second latching means for releasably engaging and maintaining said first latching means in a first position when said contacts are closed, a tripping electromagnet comprising an energizing winding and an armature operative when a predetermined electrical quantity is applied to said winding to move with respect to said winding, a second movable member having at least a portion disposed to follow the movement of said armature, said second latching means being movably supported on said second movable member to move therewith when said contacts are closed to release said first latching means when said predetermined electric quantity is applied to said winding to thereby effect opening of said contacts and time delay means for effecting a predetermined time delay in the movement of said second movable member to follow said armature.

12. A circuit breaker comprising relatively movable contacts, operating means for opening said contacts, a first movable member movable to actuate said operating means to effect automatic opening of said contacts, first latching means having a top and sides and movable in a predetermined plane for releasably maintaining said movable member in a predetermined position when said contacts are closed, second latching means for releasably engaging one side of and maintaining said first latching means in a predetermined position when said contacts are closed, a tripping electromagnet, comprising an energizing winding and an armature operative when a predetermined electrical quantity is applied to said winding to move with respect to said winding, a generally L-shaped movable member having a first portion biased to follow the movement of said armature and a second portion, said second latching means being movably supported on the second portion of the last-mentioned member to move therewith when said contacts are closed to release said first latching means and to effect opening of said contacts when said predetermined electric quantity is applied to said winding, said second latching means being disposed to frictionally bear against the top of said first latching means when the latter means is released, and means for actuating said second latching means to move independently of said second movable member when said first latching means is released to reduce the friction therebetween.

13. A circuit breaker comprising relatively movable contacts, operating means for opening said contacts, a first movable member movable to actuate said operating means to effect automatic opening of said contacts, first latching means having a top and sides and movable in a predetermined plane for releasably maintaining said movable member in a predetermined position when said contacts are closed, second latching means for releasably engaging one side of and maintaining said first latching means in a predetermined position when said contacts are closed, a tripping electromagnet comprising an energizing winding and an armature operative when a predetermined electrical quantity is applied to said winding to move with respect to said winding, means for biasing said armature against the movement of said armature caused by the energizing of said winding, a generally L-shaped movable member having a first portion biased to follow the movement of said armature and a second portion, said second latching means being movably supported on the second portion of the last-mentioned member to move therewith when said contacts are closed to release said first latching means and to effect opening of said contacts when said predetermined electric quantity is applied to said winding, said second latching means being disposed to frictionally bear against the top of said first latching means when the latter means is released, and means for actuating said second latching means to move independently of said second movable member when said first latching means is released to reduce the friction therebetween.

14. A circuit breaker comprising relatively movable contacts, operating means for opening said contacts, a first movable member movable to actuate said operating means to effect automatic opening of said contacts, first latching means for releasably latching said movable member in a first predetermined position when said contacts are closed, means for biasing said movable member to move away from said first predetermined position to a second predetermined position to thereby effect opening of said contacts when said latching means is released, second latching means for releasably latching said first latching means to maintain said movable member in said first predetermined position, a second movable member for movably supporting said second latching means thereon and for actuating said second latching means to release said first latching means and a tripping electromagnet comprising an energizing winding and an armature operative upon energization of said winding by current above a predetermined value to move between predetermined positions, said second movable member being disposed to follow the movement of said armature and to actuate said second latching means to release said first latching means, said second latching means being relatively movable on said second movable member when said armature moves between said predetermined positions to reduce the energy required to return said first movable member to said first predetermined position.

15. A circuit breaker comprising relatively movable contacts, operating means for opening said contacts, a first movable member movable to actuate said operating means to effect automatic opening of said contacts, first latching means for releasably maintaining said movable member in a first position when said contacts are closed, second latching means for releasably engaging and maintaining said first latching means in a first position when said contacts are closed, a tripping electromagnet comprising an energizing winding and an armature operative when a predetermined electrical quantity is applied to said winding to move with respect to said winding, a second movable member having at least a portion disposed to follow the movement of said armature, said second latching means being movably supported on said second movable member to move therewith when said contacts are closed to release said first latching means when said predetermined electric quantity is applied to said winding to thereby effect opening of said contacts and time delay means for effecting a predetermined time delay in the movement of said second movable member to follow said armature, said time delay means comprising a housing defining a chamber within said housing a flexible diaphragm sealing off one portion of said chamber from the other portion of said chamber, an opening in said housing leading into said one portion of said chamber closed off by said diaphragm, and a flat strip member movable with respect to said opening to define a generally wedge-shaped relatively thin passageway leading into said opening from the exterior of said housing.

16. A circuit breaker comprising relatively movable contacts, operating means for opening said contacts, a first movable member movable to actuate said operating means to effect automatic opening of said contacts, a second movable member movable in a first plane to effect movement of said first movable member, a third movable member movable in a second plane spaced from and substantially parallel to said first plane to effect movement of said first movable member, driving means responsive to an applied electrical quantity for providing an output torque having a speed which varies with the value of said electrical quantity, driven means actuable by the output torque of said driving means to effect the movement of said second movable member after a predetermined time delay which varies with the speed of said output torque, means operable to mechanically couple the output torque of said driving means to said driven means, means responsive to the same electrical quantity for operating the latter means to couple the output torque of said driving means to said driven means when the value of said electrical quantity reaches a predetermined value, first latching means for releasably maintaining said third movable member in a predetermined position when said contacts are closed, second latching means for releasably maintaining said first latching means in a predetermined position when said contacts are closed, a tripping electromagnet comprising an energizing winding and an armature operative when a predetermined electrical quantity is applied to said winding to move substantially instantaneously with respect to said winding, a fourth movable member having at least a portion disposed to follow the movement of said armature, said second latching means being movably supported on said fourth movable member to move therewith when said contacts are closed to release said first latching means when said predetermined electrical quantity is applied to said winding to thereby effect opening of said contacts, and means for actuating said second latching means to move independently of said fourth movable member when said first latching means is released.

17. A circuit breaker comprising relatively movable contacts, operating means for opening said contacts, a first movable member movable to actuate said operating means to effect automatic opening of said contacts, a second movable member movable in a first plane to effect movement of said first movable member, a third movable member movable in a second plane spaced from and substantially parallel to said first plane to effect movement of said first movable member, driving means responsive to an applied electrical quantity for providing an output torque having a speed which varies with the value of said electrical quantity, driven means actuable by the output torque of said driving means to effect the movement of said second movable member after a predetermined time delay which varies with the speed of said ouput torque means operable to mechanically couple the output torque of said driving means to said driven means, means responsive to the same electrical quantity for operating the latter means to couple the output torque of said driving means to said driven means when the value of said electrical quantity reaches a predetermined value, first latching means for releasably maintaining said third movable member in a predetermined position when said contacts are closed, second latching means for releasably maintaining said first latching means in a predetermined position when said contacts are closed, a tripping electromagnet comprising an energizing winding and an armature operative when a predetermined electrical quantity is applied to said winding to move substantially instantaneously with respect to said winding, a fourth movable member having at least a portion disposed to follow the movement of said armature, said second latching means being movably supported on said fourth movable member to move therewith when said contacts are closed to release said first latching means when said predetermined electrical quantity is applied to said winding to thereby effect opening of said contacts, and time delay means for effecting a predetermined time delay relatively less than that introduced by said driven means in the movement of said fourth movable member to follow said armature.

18. A control device comprising a movable member, driving means responsive to an applied electrical quantity for providing an output torque having a speed which varies with the magnitude of the applied electrical quantity, driven means actuable by the output torque of said driving means when coupled thereto to move said movable member after a predetermined time delay which varies with the speed of said driving means, and means for coupling the output of said driving means to said driven means only when the magnitude of the applied electrical quantity reaches a predetermined value to start said predetermined time delay.

19. A control device comprising a movable member, an induction device responsive to an applied electrical quantity for providing an output torque having a speed which varies with the magnitude of the electrical quantity, driven means actuable by the output torque of said induction device to effect the movement of said movable member after a predetermined time delay which varies with the speed of said output torque, means actuable to mechanically couple the output torque of said induction device to said driven means, and electromagnetic means responsive to the same electrical quantity for actuating the last-mentioned means to couple the output torque of said induction device to said driven means when the magnitude of the electrical quantity reaches a predetermined value.

20. A control device comprising a movable member, an induction device responsive to an applied electrical quantity for providing a drive having a speed which varies with the value of the electrical quantity, driven means actuable by the drive of said induction device to effect movement of said movable member after a predetermined time delay which varies with the speed of said drive, means for establishing a drive from said induction device to said driven means, and means responsive to said electrical quantity for actuating said drive establishing means to establish a drive from said induction device to said driven means when said electrical quantity reaches a predetermined value to thereby initiate the start of said predetermined time delay, said drive establishing means comprising a plurality of normally spaced gears which are engageable when actuated by said last-mentioned means.

21. A control device comprising a first movable member, first latching means for releasably maintaining said movable member in a first position, second latching means for releasably engaging and maintaining said first latching means in a first position when said first movable member is in said first position, a tripping electromagnet comprising an energizing winding and an armature operative when a predetermined electrical quantity is applied to said winding to move with respect to said winding, a second movable member having at least a portion disposed to follow the movement of said armature, said second latching means being movably supported on said second movable member to move therewith when said first movable member is in said first position to release said first latching means when said predetermined electric quantity is applied to said winding and means for actuating said second latching means when said first latching means is released to move independently of said second movable member to thereby reduce the energy required to return said first movable member to its first position after being moved therefrom.

22. A control circuit comprising a first movable member, first latching means having a top and sides and movable in a predetermined plane for releasably maintaining said first movable member in a predetermined position, second latching means for releasably engaging one side of and maintaining said first latching means in a predetermined position when said movable member is in said predetermined position, a tripping electromagnet comprising an energizing winding and an armature operative when a predetermined electrical quantity is applied to said winding to move with respect to said winding, means for biasing said armature against the movement of said armature caused by the energizing of said winding, a generally L-shaped movable member having a first portion biased to follow the movement of said armature and a second portion, said second latching means being movably supported on the second portion of the last-mentioned member to move therewith when said first movable member is in said predetermined position to release said first latching means when said predetermined electric quantity is applied to said winding, said second latching means being disposed to frictionally bear against the top of said first latching means when the latter means is released, and means for actuating said second latching means to move independently of said second movable member when said first latching means is released to reduce the friction therebetween.

References Cited by the Examiner

UNITED STATES PATENTS 3,109,962 11/1963 Sonnemann ------- 317—167 X

BERNARD A. GILHEANY, *Primary Examiner.*

R. N. ENVALL, Jr., *Assistant Examiner.*